United States Patent
Sivertsen

(10) Patent No.: US 9,323,353 B1
(45) Date of Patent: Apr. 26, 2016

(54) CAPACITANCE SENSING DEVICE FOR DETECTING A THREE-DIMENSIONAL LOCATION OF AN OBJECT

(71) Applicant: American Megatrends, Inc., Norcross, GA (US)

(72) Inventor: Clas G. Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 128 days.

(21) Appl. No.: 14/054,382

(22) Filed: Oct. 15, 2013

Related U.S. Application Data

(63) Continuation-in-part of application No. 13/741,669, filed on Jan. 15, 2013, now Pat. No. 9,110,547.

(51) Int. Cl.
  *G06F 3/0346* (2013.01)
  *G06F 3/023* (2006.01)
  *G06F 3/044* (2006.01)

(52) U.S. Cl.
  CPC .............. *G06F 3/0346* (2013.01); *G06F 3/023* (2013.01); *G06F 3/044* (2013.01)

(58) Field of Classification Search
  CPC ....... G06F 3/0346; G06F 3/044; G06F 3/023; G06F 3/017; G06F 2203/04101; G06F 2203/04108
  See application file for complete search history.

(56) References Cited

U.S. PATENT DOCUMENTS

| | | | |
|---|---|---|---|
| 8,294,687 B1 | 10/2012 | Ksondzyk | |
| 8,390,597 B2 | 3/2013 | Bernstein | |
| 8,692,795 B1 | 4/2014 | Kremin et al. | |
| 8,717,325 B1* | 5/2014 | Hermes | 345/173 |
| 8,860,682 B1 | 10/2014 | Kremin et al. | |
| 2007/0139379 A1 | 6/2007 | Kehlstadt et al. | |
| 2008/0122798 A1 | 5/2008 | Koshiyama et al. | |
| 2008/0277171 A1 | 11/2008 | Wright | |
| 2008/0297486 A1 | 12/2008 | Kim | |
| 2009/0128498 A1* | 5/2009 | Hollemans et al. | 345/173 |
| 2009/0189867 A1 | 7/2009 | Krah | |
| 2009/0289914 A1* | 11/2009 | Cho | 345/173 |
| 2009/0309851 A1 | 12/2009 | Bernstein | |
| 2010/0020035 A1* | 1/2010 | Ryu et al. | 345/173 |
| 2010/0134422 A1 | 6/2010 | Borras | |
| 2011/0063224 A1 | 3/2011 | Vexo et al. | |
| 2011/0096024 A1* | 4/2011 | Kwak | 345/174 |
| 2011/0149375 A1 | 6/2011 | Kothari et al. | |
| 2011/0261007 A1 | 10/2011 | Joharapurkar et al. | |
| 2011/0291985 A1* | 12/2011 | Wakako et al. | 345/174 |

(Continued)

OTHER PUBLICATIONS

U.S. Appl. No. 13/741,669, filed Jan. 15, 2013, Sivertsen.

(Continued)

*Primary Examiner* — Nalini Mummalaneni
*Assistant Examiner* — Ivelisse Martinez Quiles
(74) *Attorney, Agent, or Firm* — Lee & Hayes, PLLC

(57) ABSTRACT

A mechanism for utilizing multiple reconfigurable hover sensing arrays to detect the 3D location of an object with respect to a capacitive panel is disclosed. The multiple reconfigurable hover sensing arrays may change size and shape by integrating multiple capacitive sensor electrodes. The distance to an object relative to the capacitive panel may be determined by applying a distance formula to capacitive signals detected by the reconfigurable hover sensing arrays. In addition, a user interaction interface that may change the shape of the identifier of the interface corresponding to the detected 3D movement of the object is also disclosed.

15 Claims, 17 Drawing Sheets

(56) References Cited

U.S. PATENT DOCUMENTS

| | | | |
|---|---|---|---|
| 2012/0013569 A1* | 1/2012 | Swedin | 345/174 |
| 2012/0044199 A1 | 2/2012 | Karpin et al. | |
| 2012/0050216 A1* | 3/2012 | Kremin et al. | 345/174 |
| 2012/0120002 A1* | 5/2012 | Ota | 345/173 |
| 2012/0200531 A1 | 8/2012 | Araki | |
| 2012/0287065 A1* | 11/2012 | Oshinome | 345/173 |
| 2013/0021294 A1* | 1/2013 | Maharyta et al. | 345/174 |
| 2013/0106773 A1* | 5/2013 | Tokutake | 345/174 |

OTHER PUBLICATIONS

Office action for U.S. Appl. No. 13/741,669, mailed on Oct. 23, 2014, Sivertsen, "Capacitance Sensing Device", 37 pages.

\* cited by examiner

CAPACITANCE SENSING DEVICE FOR DETECTING A THREE-DIMENSIONAL LOCATION OF AN OBJECT

CROSS-REFERENCE TO RELATED APPLICATIONS

This application is a continuation-in-part of U.S. patent application Ser. No. 13/741,669, filed on Jan. 15, 2013, and entitled "Capacitance Sensing Device", which is expressly incorporated herein by reference in its entirety.

BACKGROUND

Capacitive touch panels are extensively utilized in consumer electronic devices, such as smartphones, tablet computing devices, and keyboards to detect user input gestures. Most of these consumer electronic devices, however, are capable of detecting input gestures within only a limited proximity range. It is with respect to these and other considerations that the present disclosure has been made.

SUMMARY

The disclosure made herein pertains to mechanisms for utilizing a capacitive touch panel for detecting the three-dimensional ("3D") location of an object. In one particular embodiment disclosed herein, a mechanism is provided for controlling the shape and size of an on-screen 3D location identifier by utilizing a capacitive touch panel configured to detect the 3D location and/or movement of an object.

In order to provide the on-screen 3D location identifier, a microcontroller is configured in one embodiment to determine the distance between an object and a capacitive touch panel. The capacitive touch panel may have multiple capacitive sensor electrodes affixed thereto. The microcontroller may set multiple reconfigurable hover sensing arrays ("RHSA") with a first size by electrically coupling at least two electrodes of the multiple capacitive sensor electrodes via an integration bus bar, utilize the multiple RHSAs to detect capacitive signals caused by the capacitance between the object and the RHSAs with the first size, determine a first threshold value corresponding to the first size of the multiple RHSAs, and determine the 3D location of the object based on the detected capacitive signals and the first threshold value. A processor then determines the size of the 3D location identifier to be displayed on screen corresponding to the determined distance between the object and the capacitive touch panel. A display screen is then utilized to display the 3D location identifier.

Aspects of the subject matter described herein might be implemented as a computer-implemented method, in a computing system, as an apparatus, or as an article of manufacture such as a computer-readable storage medium. These and various other features as well as advantages will be apparent from a reading of the following detailed description and a review of the associated drawings.

DETAILED DESCRIPTION

Details regarding the various embodiments disclosed herein will now be presented with reference to the accompanying drawings. The disclosure presented herein with regard to the various embodiments is illustrative and is not intended to limit the disclosure to these embodiments. Rather, the disclosure made herein is intended to cover alternatives, modifications and equivalents that may be included without departing from the spirit of the present invention as defined by the claims included herewith. Numerous details are set forth to provide a thorough understanding of various embodiments disclosed herein. Well known methods, techniques, processes, circuits, component parts, structures, or systems obvious to one of the ordinary skill are not further described in detail to avoid unnecessarily obscuring the understanding of the various embodiments presented hereby.

Figure 1A:
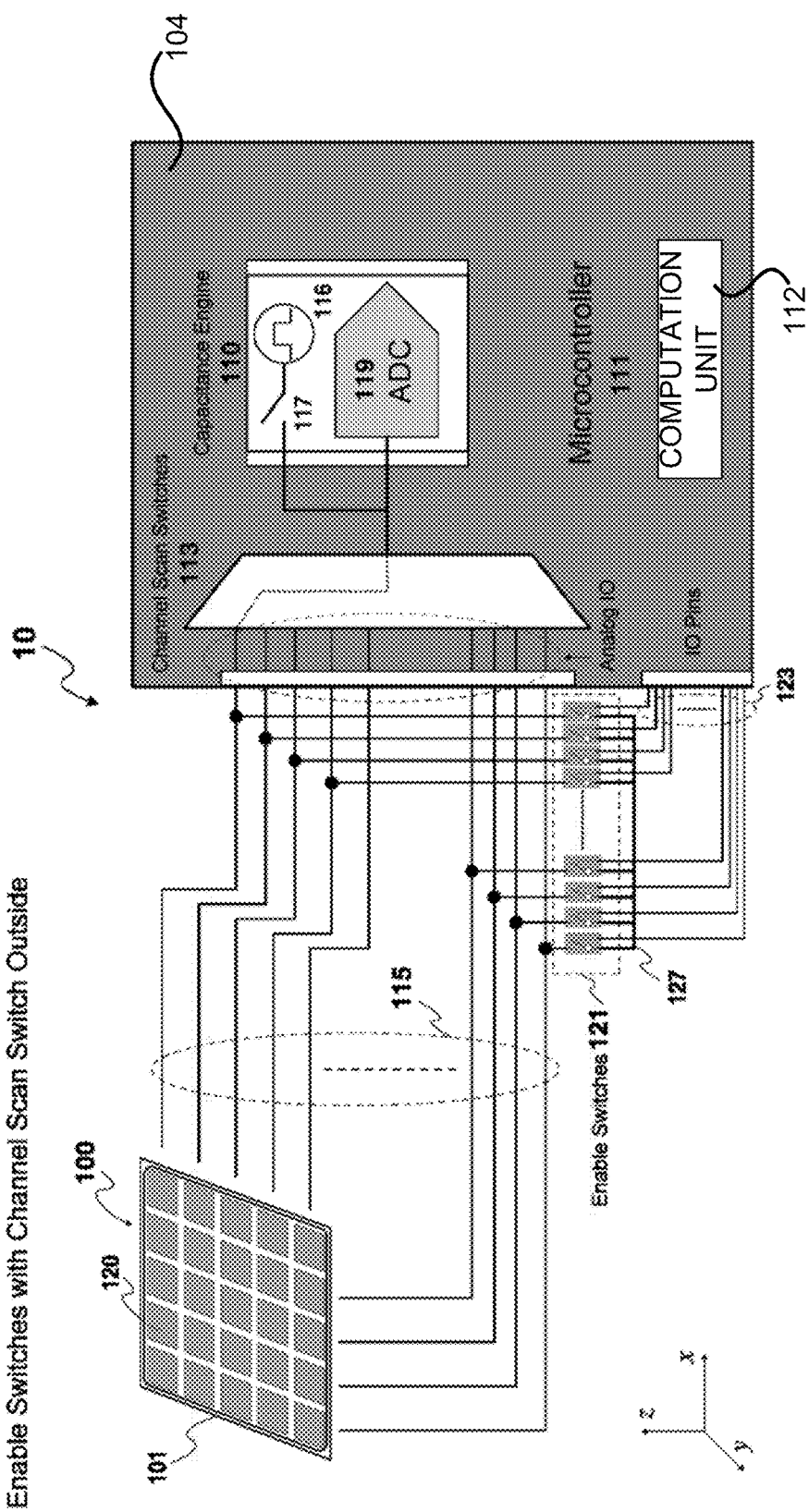
FIGS. 1A-1C are schematic diagrams showing aspects of an exemplary hover sensing system that utilizes multiple capacitive sensor electrodes to detect objects, according to embodiments disclosed herein.

Turning now to FIG. 1A, various aspects of a hover sensing system 10 will be described. As will be discussed in greater detail below, the "hover" sensing system 10 is configured to detect the presence, movement, and/or 3D location of an object, a user's "hovering" gesture, or a user's proximity touch. In order to provide this functionality, the hover sensing system 10 includes a hover sensing panel 100 and an electrical component region 104 in one embodiment disclosed herein.

The hover sensing panel 100 includes a substrate 101 and a multitude of capacitive sensor electrodes ("CSE") 120 arranged thereupon. The hover sensing panel 100 can be, but is not limited to, a self-capacitive touch panel. For purposes of discussion herein, the substrate 101 may be considered to be oriented a plane with an X-axis and a Y-axis that are perpendicular to one other, as illustrated in FIG. 1A. The distance between an object and the hover sensing panel 100 may be determined along a Z-axis that is perpendicular to the plane that includes the X-axis and the Y-axis.

The substrate 101 can be a printed circuit board, a transparent board, glass, or another type of planar object made of material upon which the CSE 120 may be affixed. The CSEs 120 can be made of metals or any alternative material, such as copper or indium tin oxide ("ITO"), so long as the material induces a capacitance change when a finger or another type of object approaches. Accordingly, the hover sensing panel 100 may detect a capacitance change when a finger or an object approaches, which may be referred to herein as "hovering" over the hover sensing panel 100.

The electrical component region 104 includes electrical components, such as a microcontroller 111 and a plurality of enable switches 121. The microcontroller 111 may include a computation unit 112, such as a processor, a central processing unit ("CPU"), or a microprocessor. The computation unit 112 can be any type of computation device configured to execute instructions and to control electrical components in the manner disclosed herein. The computation unit 112 is configured to integrate, or electrically couple, multiple CSE 120 as a RHSA 124 (not shown in FIG. 1A), to detect the capacitance change induced by the RHSA 124 when an object or a user's finger is presented, and to determine the location of a finger or another type of object based on the capacitance change detected. Additional details regarding this process will be provided below.

The microcontroller 111 might also include channel scan switches 113. The channel scan switches 113 allow the microcontroller 111 to detect the capacitance change of each CSE 120. Each CSE 120 is coupled to a channel of channel scan switches 113 respectively via an electrical connection, such as one or more channel lines 115.

In some embodiments, the microcontroller 111 also includes a capacitance engine 110 for sending detection signals and sampling response signals. The capacitance engine 110 includes a detection signal source 116, a detection signal source switch 117, and an analog-to-digital converter ("ADC") 119. The detection signal source 116 sends detection signals to CSE 120 when the detection signal source switch 117 is closed. The ADC 119 samples the response signals from the CSE 120 when the detection signal source switch 117 is open. The response signals sampled by the ADC 119 may be affected when an object or a user's finger induces a capacitance change on the CSE 120, on the RHSA 124, or on the hover sensing panel 100.

Each of the enable switches 121 may be opened or closed by the computation unit 112 via an input/output ("I/O") pin and a short circuit control line 123, as shown in FIG. 1A. Each of the enable switches 121 is also coupled to an electrode of a CSE 120, respectively, via the short circuit control lines 123 and the channel lines 115. In addition, each of the enable switches 121 is also coupled to the integration bus bar 127 such that when computation unit 112 closes any two enable switches 121, the corresponding two electrodes of the CSE 120 are short circuited, or integrated, via the integration bus bar 127. Accordingly, the existence of the integration bus bar 127 allows the computation unit 112 to define any number of electrodes of the CSE 120 to reconfigure the shape and the size of a RHSA 124 by controlling the state of the enable switches 121. In other words, the enable switches 121, along with the integration bus bar 127, enable the reconfiguration of various shapes and sizes of RHSAs 124.

Figure 1B:
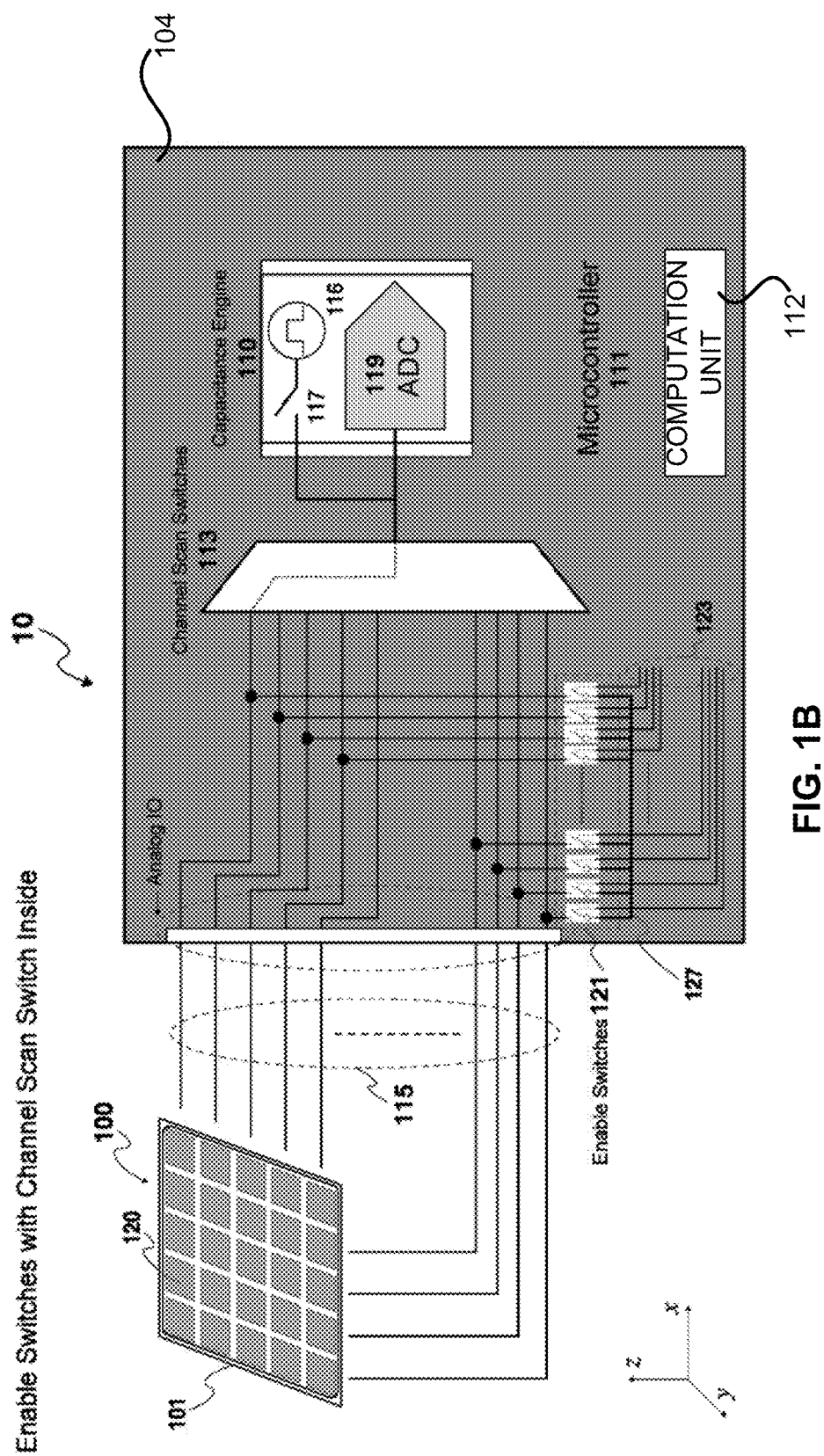
Figure 1C:
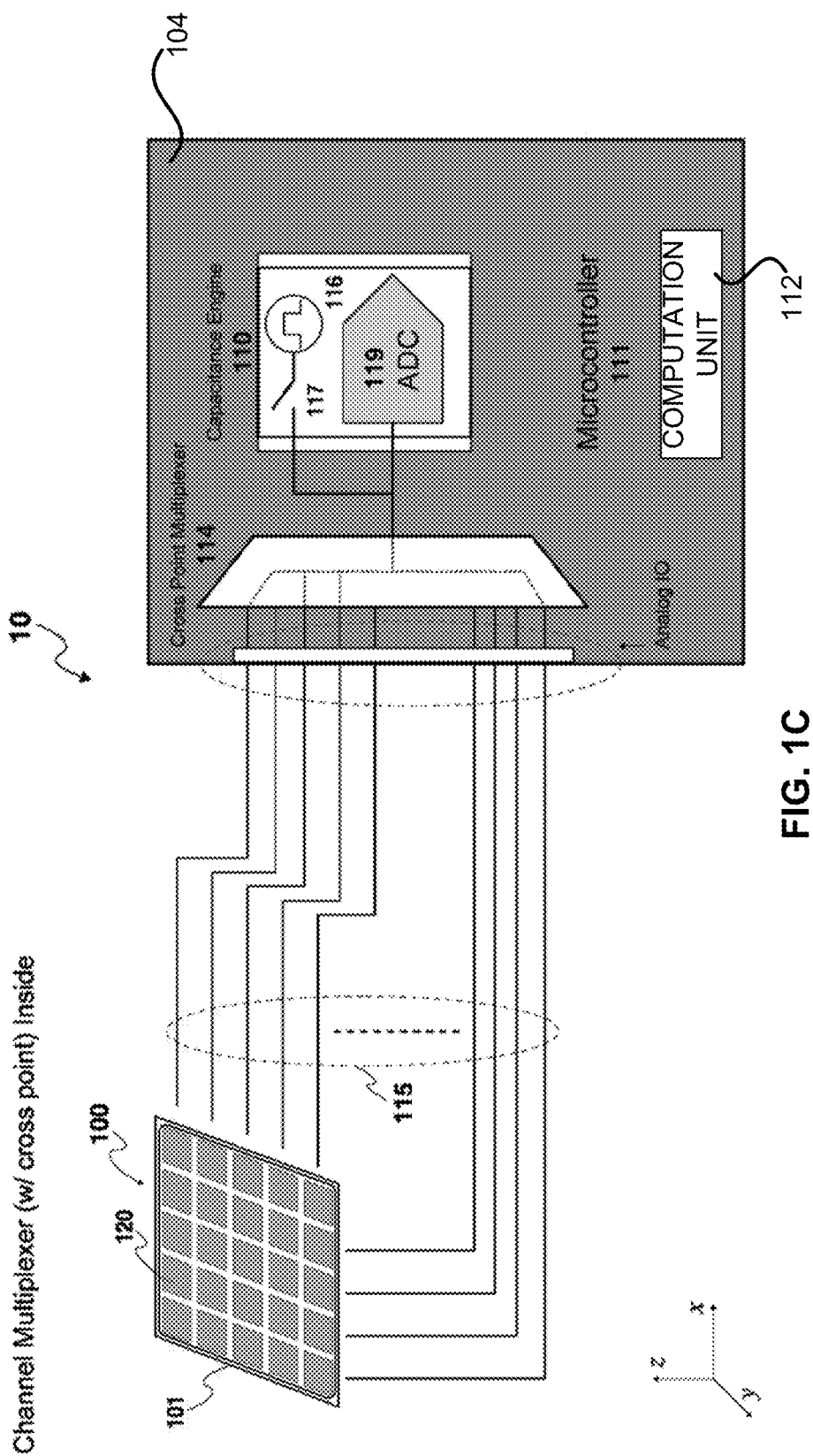

FIG. 1B illustrates another hover sensing system 10 that is configured similarly to the hover sensing system shown in FIG. 1A. In the system 10 of FIG. 1B, however, the enable switches 121 have been integrated with the microcontroller 111. FIG. 1C illustrates a hover sensing system 10 similar to that illustrated in FIG. 1B. In the example shown in FIG. 1C, however, the microcontroller 111 includes a cross point multiplexer 114 that may replace the function of the enable switches 121 and the channel scan switches 113.

The cross point multiplexer 114, the detection signal source 116, the detection signal source switch 117, the ADC 119, and the computation unit 112 may be integrated as an application-specific integrated circuit ("ASIC") microcontroller 111 in some embodiments. Accordingly, the microcontroller 111 may integrate or electrically couple any number of electrodes of the CSE 120.

In some embodiments, the microcontroller 111 may utilize this functionality to reconfigure the shape and the size of RHSA 124 when the distance between an object and the hover sensing panel 100 changes. The microcontroller 111 might also determine an object's location with respect to the X-axis and the Y-axis of hover sensing panel 100 based on the response signal or capacitance changes induced by the object. One method for performing such a determination is described below with reference to FIG. 5.

Figure 2A:
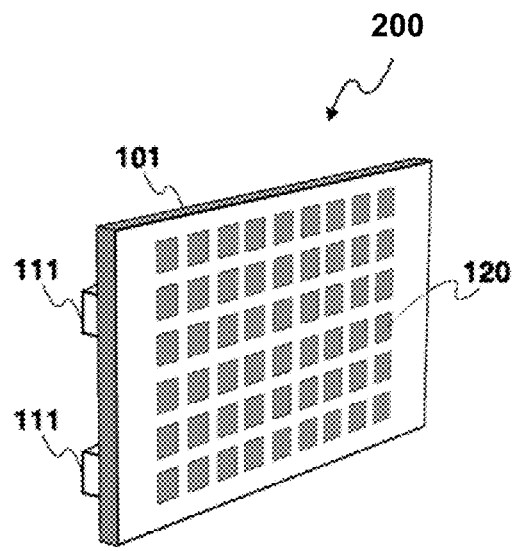
FIGS. 2A-2B are pictorial diagrams showing a side view and a front view, respectively, of a hover input device provided according to one embodiment disclosed herein.
Figure 2B:
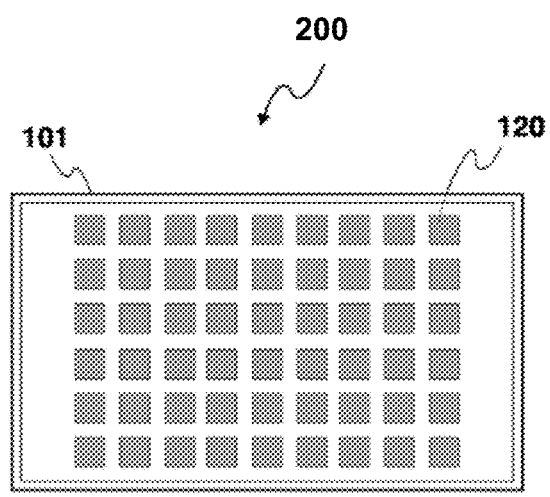

In one embodiment disclosed herein, the hover sensing system 10 is utilized by a hover input device 200 as shown in FIGS. 2A and 2B. In one particular implementation, the CSE 120 are located on one side of the substrate 101 and the microcontroller 111 is located on the other another side of the substrate 101. The hover input device 200 may be a peripheral input device or a device embedded in mobile telephone, notebook, tablet computing device, television ("TV"), smart TV, flat screen display device, or any other type of electronic device that utilizes a user input mechanism.

Figure 3:
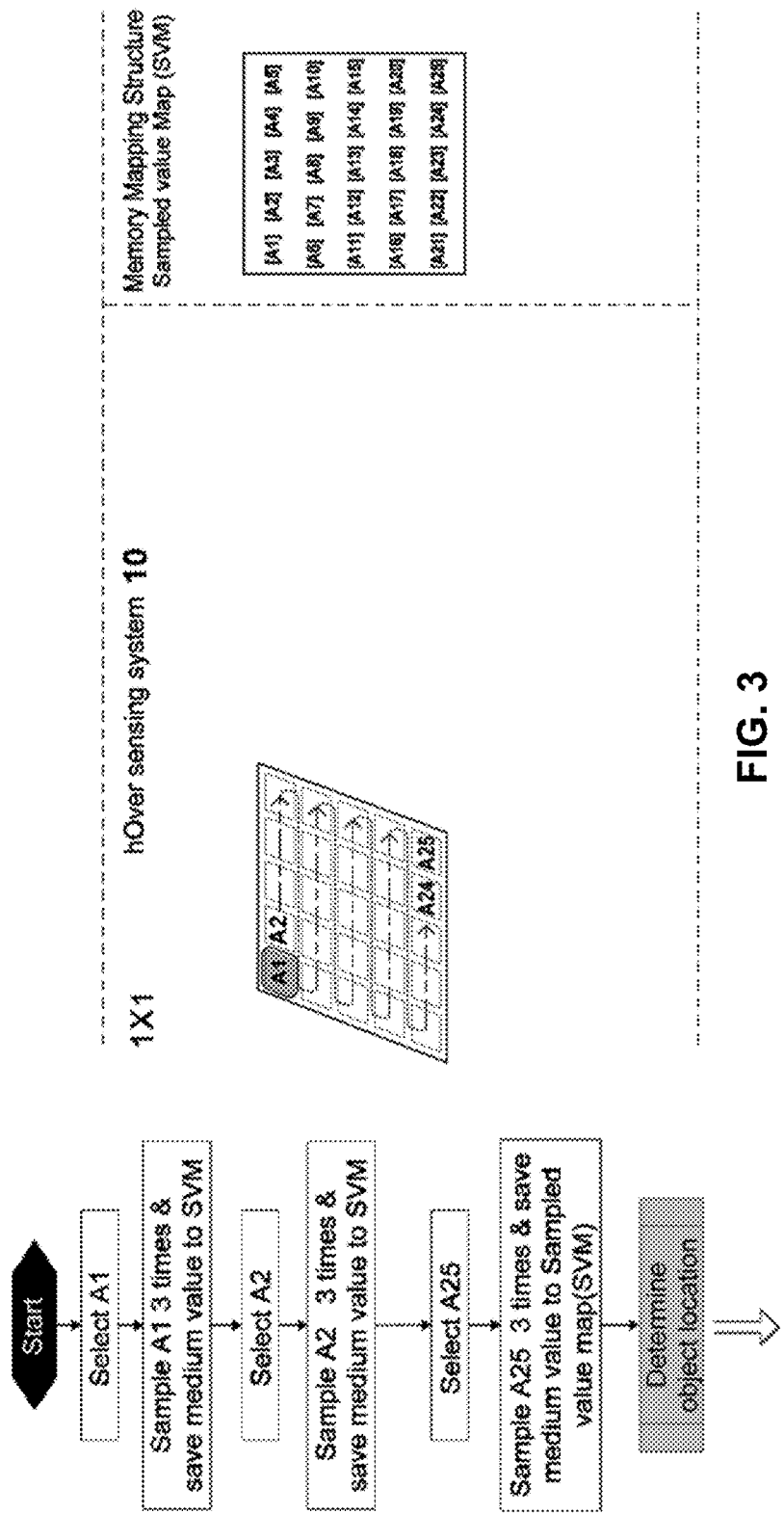
FIG. 3 includes a flow diagram showing aspects of one scanning and sampling method for operating a hover sensing system, according to one embodiment disclosed herein.

FIG. 3 shows aspects of one illustrative mechanism for scanning and sampling to operate the hover sensing system 10. In particular, the microcontroller 111 initially selects a first CSE 120 by controlling the appropriate enable switches 121. For the purpose of illustration, the selected electrode is denoted in FIG. 3 as "A1." The capacitance engine 110 then performs a value sampling action, which sends detection signals to A1, opens detection signal source switch 117, and samples the response signals of A1. The capacitance engine 110 might perform the sampling action multiple times. For example, in one particular example, the capacitance engine 110 repeats the value sampling action three times.

The microcontroller 111 then saves the median value of the three sampled values in a sampled value map ("SVM"). The SVM is a data structure that stores the values sampled from the CSE 120. Repeating the value sampling action multiple times and saving only the median sampled value may help to reduce the influence of noise on the detected signal. Alternatively, three sampled values may be retrieved and the maximum and the minimum of the sampled values may be discarded. The remaining value may be saved in the SVM. To further reduce the effects of noise, sampling may occur an odd number of times greater than three and the median value of the sampled values may be saved in the SVM.

After the median value has been saved, the microcontroller 111 selects another CSE 120 by controlling the enable switches 121 in the manner described herein. For the purpose of illustration, the selected electrode is denoted as "A2" in FIG. 3. The capacitance engine 110 then performs a value sampling action that sends detection signals to A2, opens the detection signal source switch 117, and samples the response signals. As in the example described above, the capacitance engine 110 might repeat the value sampling action multiple times, such as three times in some implementations. The microcontroller 111 then saves the median value of the three sampled values in the SVM.

Figure 5:
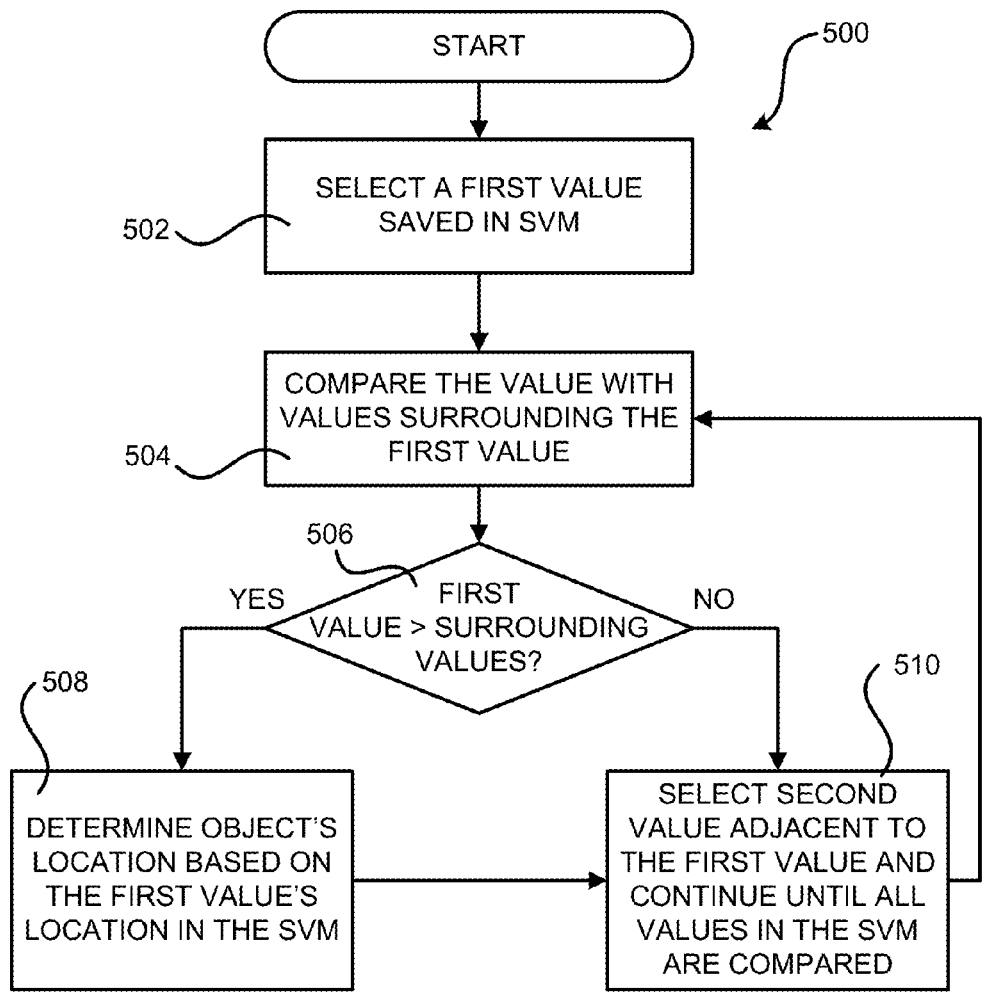
FIG. 5 is a flow diagram showing aspects of one illustrative routine for determining the location of objects based on signals detected by capacitive sensor electrodes arranged in RHSAs, according to embodiments disclosed herein.

The process described above might then be repeated in order to sample values for each of the CSE 120. In this way, the microcontroller 111 creates a SVM having sampled values corresponding to each of the CSE 120. For example, if a 5×5 matrix of CSE 120 is utilized, the procedure described above would create a SVM with sampled values [A1], [A2], . . . [A25], as shown in FIG. 5. As will be described in greater detail below, the location of an object in proximity to the hover sensing system 10 can then be determined utilizing the contents of the SVM. It should be appreciated that matrices of CSE 120 of different sizes may be utilized.

Figure 4A:
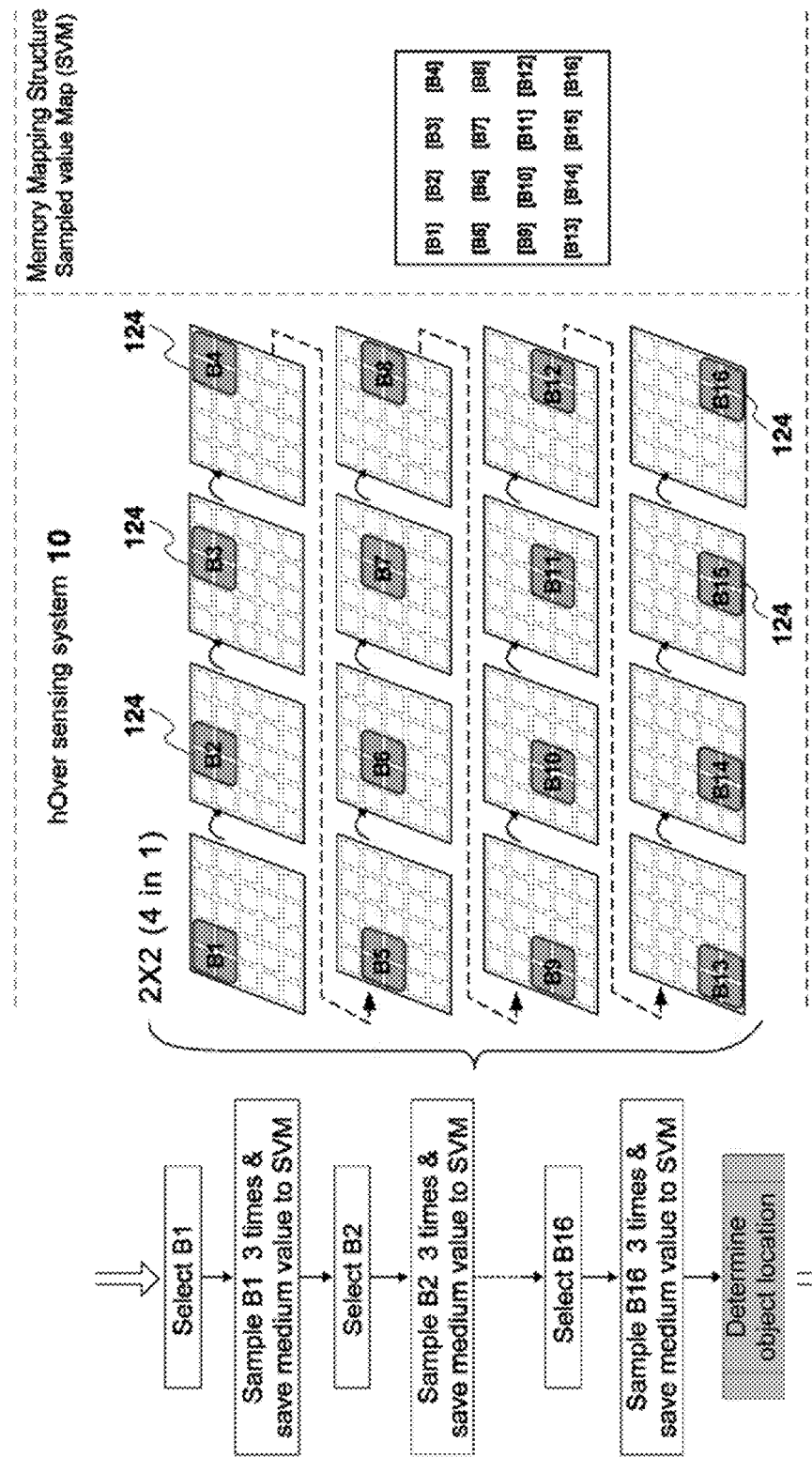
FIGS. 4A-4C include a flow diagrams and pictorial diagrams illustrating aspects of a mechanism for scanning and sampling to detect objects by way of RHSAs, according to embodiments disclosed herein.

FIG. 4A illustrates aspects of another scanning and sampling mechanism utilized by the hover sensing system 10 in another embodiment. In this embodiment, the microcontroller 111 selects and integrates multiple CSE 120 as a first RHSA 124 by controlling the enable switches 121 in the manner described above. For the purpose of illustration but not limiting the scope of the disclosure presented herein, the selected CSE 120 may be configured as 2×2 RHSA 124, denoted as "B1" in FIG. 4A.

The capacitance engine 110 then performs the value sampling action described above, which sends detection signals to the CSE 120 in B1, opens the detection signal source switch 117, and samples the response signals. The capacitance engine 110 then repeats the value sampling action multiple times. For example, this process might be repeated three times in one particular embodiment. The microcontroller 111 then saves the median value of the sampled values in a SVM. Because each RHSA 124 is a 2×2 matrix, the SVM is a 4×4 matrix in this example rather than a 5×5 matrix as described above with regard to FIG. 3.

The microcontroller 111 then selects and integrates another group of CSE 120 as a second 2×2 RHSA 124 by controlling the enable switches 121 in the manner described above. For the purpose of illustration, the selected electrodes may be set as a 2×2 RHSA 124 denoted as B2 in FIG. 4A.

As shown in FIG. 4A, the physical location of B2 overlaps the physical location of B1 to improve detection resolution. In one specific embodiment, each center of a RHSA 124 departs from the center of its adjacent RHSA 124 by about the distance between two adjacent CSE 120 among the two RHSAs 124.

The capacitance engine 110 then performs the value sampling action described above, which sends detection signals to B2, opens the detection signal source switch 117, and samples the response signals. The capacitance engine 110 repeats the value sampling action multiple times, such as three times in some embodiments. The microcontroller 111 then saves the median value of the sampled values in the SVM.

The process described above is then repeated for each configuration of the RHSA 124. In this way, a value is stored in the SVM corresponding to each RHSA 124 selected. For instance, if a 5×5 matrix of CSEs 120 is utilized with a 2×2 RHSA 124, this procedure would create a 4×4 SVM with sampled values [B1],[B2], . . . [B16] as shown in FIG. 4A.

As mentioned above, it may be desirable to sample values multiple times immediately after the size and shape of the RHSA 124 has been defined. This immediate sampling mechanism is equally applicable to a 2×2 RHSA 124 and to RHSAs configured in other sizes. As also mentioned above, each sampled value saved in the SVM corresponds to a physical location of a RHSA 124. The physical location of an object can be determined using the values in the SVM. Additional details regarding this process will be provided below with regard to FIG. 5.

Figure 4B:
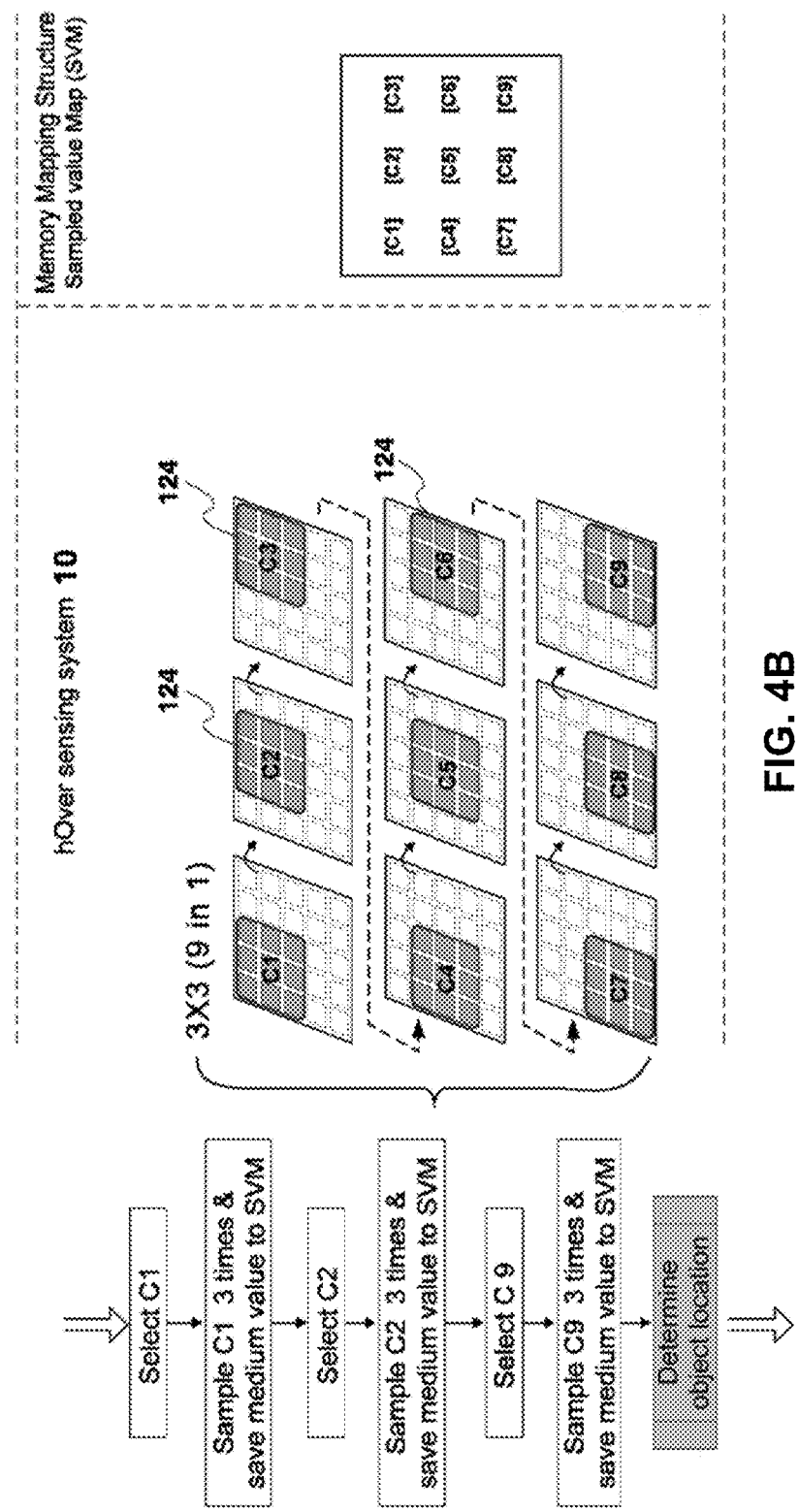
Figure 4C:
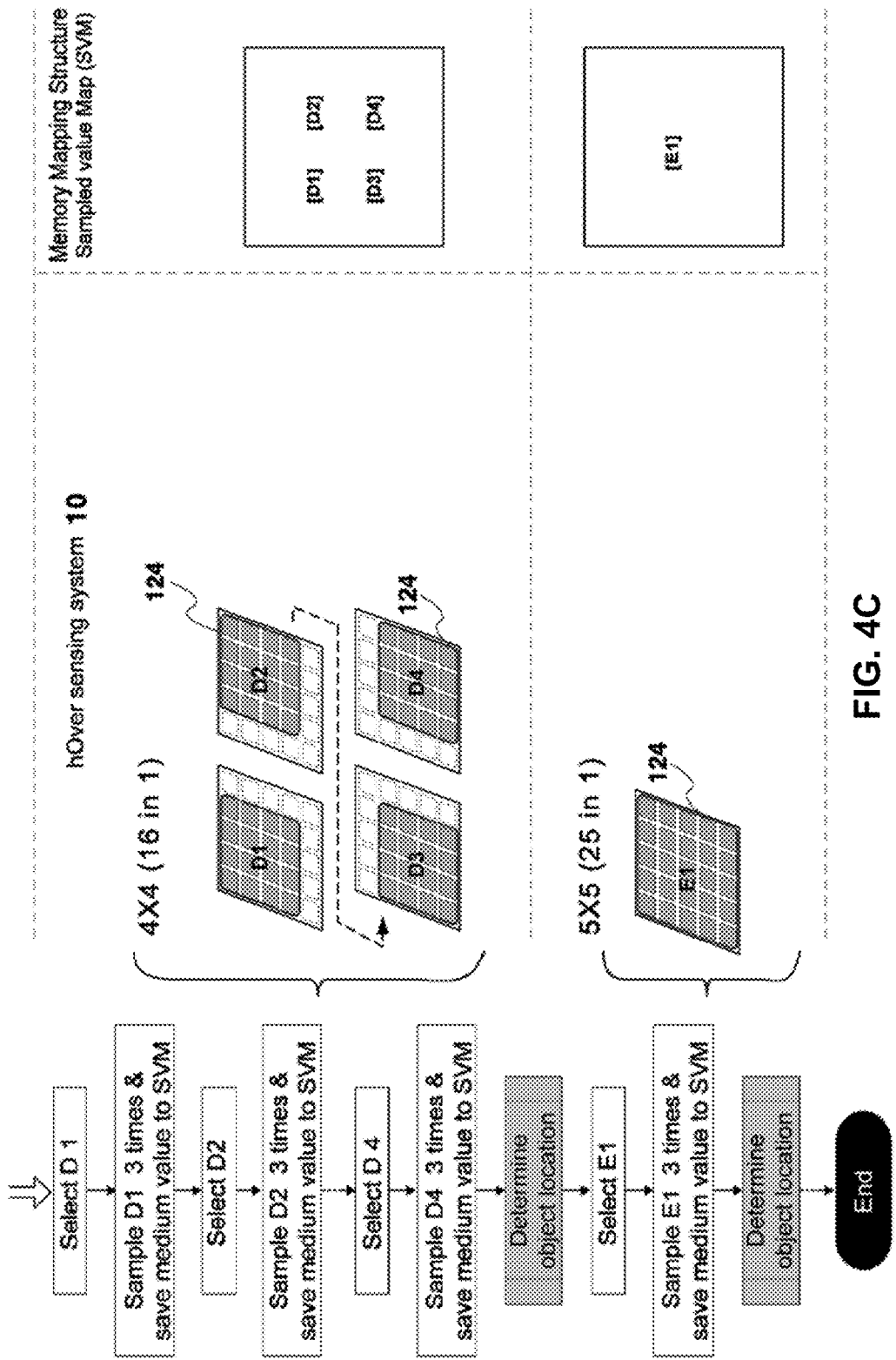

In view of the description provided above, it should be appreciated that the hover sensing array 124 might be configured in various sizes and shapes. For example, the hover sensing array 124 might be configured using a single CSE 120 as shown in FIG. 3, using a 2×2 array of CSEs 120 as shown in FIG. 4A, using a 3×3 array of CSEs 120 as shown in FIG. 4B, or using a 4×4 array of CSEs 120 as shown in FIG. 4C, or using a 5×5 array of CSEs 120 as also shown in FIG. 4C. Other configurations might also be utilized.

As the hover sensing array 124 is moved through various positions on the hover sensing panel 100, SVMs having various configurations of data values may be produced. For example, when a single CSE 120 is utilized, the SVM includes a 5×5 matrix of data values ([A1]-[A25]) as shown in FIG. 3. When a 2×2 array of CSEs 120 is utilized, a 4×4 matrix of values ([B1]-[B16]) is created in the SVM as shown in FIG. 4A. When a 3×3 array of CSEs 120 is utilized, a 3×3 matrix of values ([C1]-[C9]) is created in the SVM as shown in FIG. 4B. When a 4×4 array of CSEs 120 is utilized, a 2×2 matrix of values ([D1]-[D4]) is created in the SVM as shown in FIG. 4C. When a 5×5 array of CSEs 120 is utilized, a single data value ([E1]) is created in the SVM as also shown in FIG. 4C.

The distance at which an object may be detected by the RHSA 124 may vary based upon the configuration of the CSEs 120. A 5×5 array of CSEs 120 as shown in FIG. 4C, for example, may be able to detect the presence of an object at a distance further than the 4×4 array of CSEs 120 also shown in FIG. 4C. Similarly, the 4×4 array of CSEs 120 shown in FIG. 4C may be able to detect the presence of an object at a distance further away than the 3×3 array of CSEs 120 shown in FIG. 4B. Likewise, the 3×3 array of CSEs 120 may be able to detect the presence of an object at a distance further than the 2×2 array of CSEs 120 shown in FIG. 4A. Similarly, the 2×2 array of CSEs 120 shown in FIG. 4A may be able to detect the presence of objects at distances further than the single CSE 120 configuration shown in FIG. 3.

In order to determine the location of an object with respect to the X-axis and the Y-axis of hover sensing panel 100, the microcontroller 111 may sample response signals and create values in the SVM utilizing multiple configurations of the CSE 120. For example, the microcontroller might sample response signals using a 1×1 array CSE 120 as shown in FIG. 3, a 2×2 matrix of CSE 120 as shown in FIG. 4A, a 3×3 array of CSE 120 as shown in FIG. 4B, a 4×4 array of CSE 120 as shown in FIG. 4C, and also using a configuration in which all of the CSE 120 are utilized as also shown in FIG. 4C. The various configurations might be sampled in any order. For example, sampling might begin with a single CSE 120 and end with a 5×5 array of CSE 120. In other embodiments, sampling might begin by sampling with a 5×5 array of CSE 120 and end by sampling using a single CSE 120.

As mentioned above, better detection resolution might be achieved when the physical location of each RHSA 124 overlaps the physical location of its adjacent RHSA 124. In one implementation, for instance, each RHSA 124 departs from its adjacent RHSA 124 by a distance approximately equal to the distance between two adjacent capacitive sensor electrodes of CSE 120.

When a RHSA 124 is selected, the microcontroller 111 might control multiple enable switches 121 to define its shape. Accordingly, a systematical scanning procedure that samples values from one particular RHSA 124 to its adjacent RHSA 124 may help to reduce the number of switches in need of change. At a minimum, the microcontroller 111 may not have to change the open or close state of the enable switches that control the overlapping portion of the two adjacent RHSAs 124.

Accordingly, in one embodiment disclosed herein, the microcontroller 111 may select another RHSA 124 of which a portion overlaps a portion of a previous RHSA 124, unless the size or the shape of the RHSA 124 is changed. In some embodiments, each RHSA 124 is the same size, although present in a different physical location, as its adjacent RHSAs 124 during the procedure of creating the SVM. In addition, the sampling procedure will not shift to the next line of channel lines 115 in some embodiments until all the detection signals of a RHSA 124 along the line are sampled.

Turning now to FIG. 5, a flow diagram will be described that shows one illustrative routine 500 for determining the location of objects based on signals generated by the CSE 120 or RHSAs 124, according to one embodiment disclosed herein. It should be appreciated that the logical operations described herein with respect to FIG. 5 and the other figures may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 500 begins at operation 502, where the microcontroller 111 selects a first value saved in the SVM. The routine 500 then proceeds to operation 504, where the microcontroller 111 compares the first value with other values that surround the first value in the SVM. If the first value is greater than the surrounding values, the routine 500 proceeds from operation 506 to operation 508. If the first value is not greater than the surrounding values in the SVM, the routine 500 proceeds from operation 506 to operation 508.

At operation 508, the microcontroller 111 determines the location of a proximate object based on the first value's location with respect to other values in the SVM. Because the locations of saved values in the SVM each corresponds to a physical location of the respective CSE 120 or RHSA 124, the location of the object with respect to the hover sensing panel 100 can be determined. From operation 508, the routine 500 proceeds to operation 510.

At operation 510, the microcontroller 111 selects a second value adjacent to the first value selected at operation 502. The routine 500 then returns back to operation 504, described above, until all values saved in the SVM have been compared in the manner described above. Following the completion of the object location determination procedure shown in FIG. 5, the location of one or multiple objects in the X-Y plane of hover sensing panel 100 will have been determined. It should be appreciated that the same or similar determination procedure may be utilized with various shapes and sizes of RHSAs 124 and matrices of CSE 120, of which the shape and the size are reconfigured in corresponding to various object distances estimated from the hover sensing panel 100 along the Z-axis. For the ease of illustration, the scanning method and sampling method mentioned above with reference to FIGS. 1-5 is denoted as progressive location averment (PLA) scanning and sampling method from here forward.

According to one embodiment disclosed herein, a distance formula can also be utilized to determine the distance of an object from the hover sensing panel 100. In order to provide this functionality, a pre-calibration process may be conducted before the formula is applied to improve the accuracy of the distance detection. The pre-calibration process defines various capacitance signal threshold values that are detectable by the hover sensing panel 100 when utilizing various shapes and sizes of RHSAs 124. To simplify the discussion presented herein, the corresponding boundary distance of an m-by-n RHSA, a RHSA with m-by-n CSEs 120, is denoted as $D_{M \times N}$, and the corresponding capacitance signal threshold of the m-by-n RHSA is denoted as $C_{M \times N}$. When a m-by-n RHSA 124 is utilized, a capacitance signal threshold value, $C_{M \times N}$, can be defined as a minimal value that when any detected signal value exceeds value $C_{M \times N}$, the calibration object is considered as presented. When the detected value is below $C_{M \times N}$, the value is determined as trivial or insignificant noise.

The pre-calibration process might also determine the boundary distance of a calibration object to the hover sensing panel 100 corresponding to the various capacitance signal threshold values when utilizing various shapes and sizes of RHSA 124 of the hover sensing panel 100. The calibration process may utilize a capacitance characteristic similar to a human finger.

In typical use, the larger the size of the RHSAs 124, the greater the distance the hover sensing system 10 may detect the presence of an object. Accordingly, each size of RHSA 124 should have a corresponding capacitance signal threshold value, a corresponding distance, and the microcontroller 111 can create a corresponding SVM to store the detected capacitance signal values.

The size of the m-by-n SVM matrix is (X−M+1)×(Y−N+1), wherein X is the number of CSE 120 along the X-axis in the hover sensing panel 100, and Y is the number of CSE pads along the Y-axis in the hover sensing panel 100. The X-axis and Y-axis constitute a plane of the hover sensing panel 100. When the calibration object is approaching, or approaches, a hover sensing panel 100 that utilizes a m-by-n RHSA 124, at least one of the detected signal values stored in SVM may start to rise. Accordingly, the boundary distance $D_{M \times N}$ of the m-by-n RHSA 124 can be set as a particular distance that when the calibration object is approaching, or approaches, the hover sensing panel 100 within the particular distance, whereby at least one of the detected signal values stored in the SVM exceeds $C_{M \times N}$.

Utilizing a pre-calibration process similar to that mentioned above, various boundary distances for various sizes of RHSAs 124 can be determined. For example, boundary distances $D_{5 \times 5}$, $D_{4 \times 4}$, $D_{3 \times 3}$, $D_{2 \times 2}$, and $D_{1 \times 1}$ can be determined by utilizing corresponding 5×5, 4×4, 3×3, 2×2, and 1×1 RHSA 124. The larger the size of the RHSAs 124, the longer the corresponding boundary distance. Accordingly, it should be appreciated that $D_{5 \times 5} > D_{5 \times 4} > D_{4 \times 4} > D_{3 \times 3} > D_{2 \times 2} > D_{1 \times 1}$.

After the calibration object is located between two boundary distances and the corresponding boundary distance and capacitance signal threshold of each size of RHSA has been determined, the microcontroller 111 can easily determine the estimated distance of an object to the hover sensing panel 100 between two boundary distances by conducting PLA scanning or other sampling methods mentioned above. For example, when an objected is located between $D_{5\times 5}$ and $D_{4\times 4}$, at least one of the capacitance signals detected and stored in the SVM by 5×5 RHSAs will exceed the capacitance signal threshold value $C_{5\times 5}$, but no capacitance signal detected and stored in SVM by 4×4 RHSAs may exceed the capacitance signal threshold value $C_{4\times 4}$. The microcontroller 111 can, therefore, determine the distance of an object to the hover sensing panel 100 as between two boundary distances $D_{5\times 5}$ and $D_{4\times 4}$.

After the location of the object has been determined between two boundary distances, the location of the object can be determined by using the following distance formula: $D=K_{M\times N}*1/(Cs-C_{M\times N})^2$. In this formula, D represents the distance, the shortest distance, between the object and the hover sensing panel 100. $C_{M\times N}$ is the capacitance signal threshold value determined in the pre-calibration process described above for an m-by-n RHSA 124, where m and n are positive integers such as 1, 2, 3, 4, 5 . . . , for instance. Cs is the capacitance signal detected by the hover sensing system 10 when it utilizes m-by-n RHSAs 124 to detect the presence of an object. $K_{M\times N}$ is a distance constant that an be also determined during or after the pre-calibration process when m-by-n RHSAs 124 are utilized to detect capacitive signals. The method of $K_{M\times N}$ determination is known to those skilled in the art.

When an object is located between $D_{5\times 4}$ and $D_{4\times 4}$, the hover sensing system 10 may not be able to detect the presence of the object when utilizing 4×4 RHSA during the PLA scanning and sampling procedure. The hover sensing system 10 may, however, detect the presence of an object when it utilizes 5×5 or 5×4 RHSAs 124 because at least one of the capacitance signals stored in the corresponding 5×5 or 5×4 SVMs will exceed its corresponding threshold value. The capacitance signals that exceed the threshold value can thus be applied in the distance formula, $D=K_{5\times 5}*1/(Cs-C_{5\times 5})^2$ or $D=K_{5\times 4}*1/(Cs-C_{5\times 4})^2$, for a more accurate distance determination.

The distance between an object and the hover sensing panel 100 might also be determined by using the capacitance signals determined by the smallest size of RHSAs 124 during the distance detection scanning process described above. The distance detection scanning process can also utilize the PLA scanning and sampling method as mentioned before so that each center of RHSAs 124 just departs from the center of its adjacent RHSA for about the distance between two adjacent capacitive sensor electrodes 120 among the two RHSAs 124. Accordingly, in this example, provided that 5×4 RHSA 124 is the smallest size of RHSAs 124 that can detect an object, the distance is determined by applying the detected signals Cs exceeding $C_{5\times 4}$ and stored in 5×4 SVM to the distance formula. Thus, the object's distance to the hover sensing panel 100 is determined as $D=K_{5\times 4}*1/(Cs-C_{5\times 4})^2$.

Various RHSAs (n-by-m, n-by-m-1, . . . 1×1) can have various capacitance signal threshold values ($C_{N\times M}$, $C_{N\times M-1}$, $C_{1\times 1}$), various boundary distance ($D_{N\times M}$, $D_{N\times M-1}$ . . . $D_{1\times 1}$) and various distance constant ($K_{M\times N}$, $K_{M\times N-1}$, . . . , $K_{1\times 1}$) for distance determination. The distance determination utilizing a 5×4 RHSA 124 is provided for illustration and should not be construed to limit the scope of the disclosure presented herein.

Figure 6:
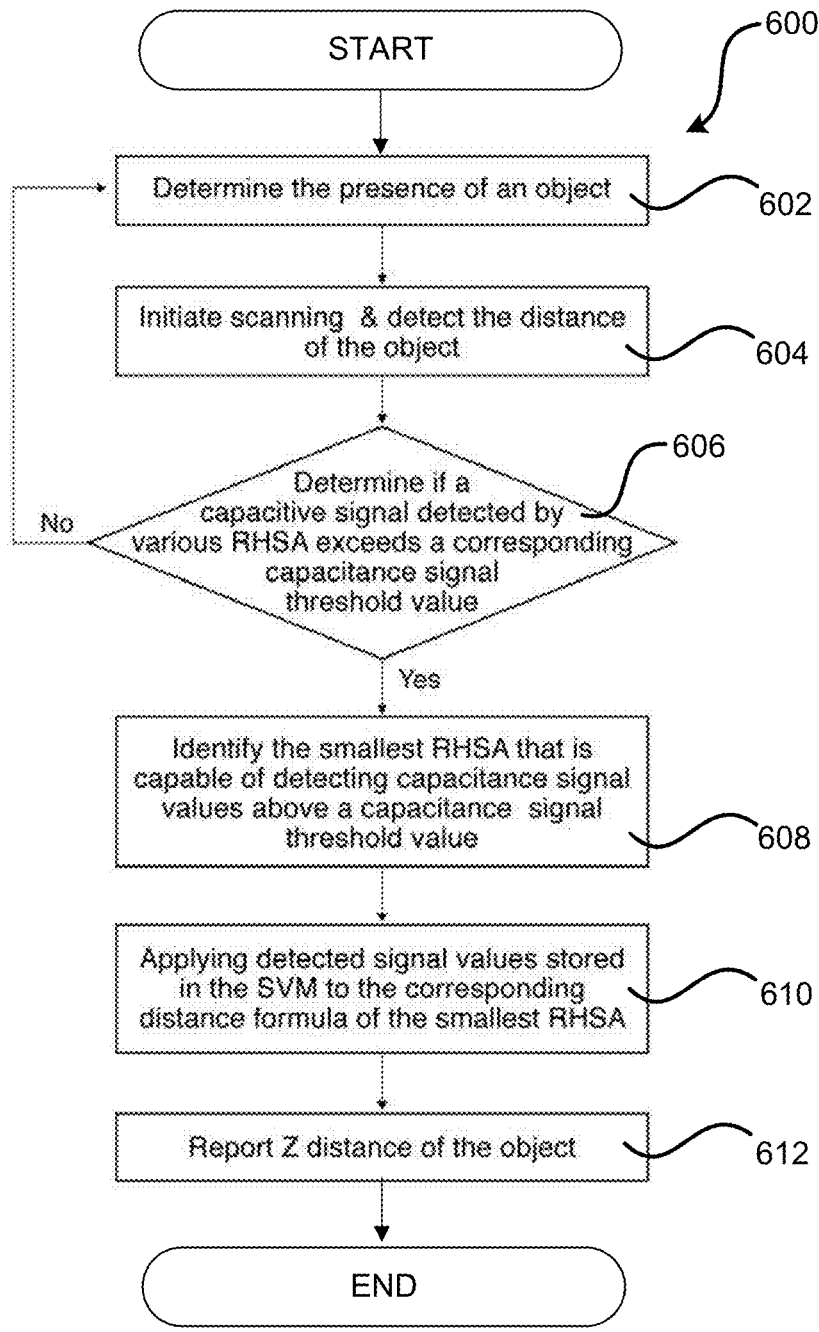
FIG. 6 is a flow diagram showing aspects of one illustrative routine for determining the distance of an object relative to a hover sensing panel based on signals detected by capacitive sensor electrodes of the hover sensing panel, according to embodiments disclosed herein.

FIG. 6 is a flow diagram showing aspects of one illustrative routine 600 for determining the distance of an object relative to a hover sensing panel 100 based on signals detected by capacitive sensor electrodes 120 of the hover sensing panel 100, according to one embodiment disclosed herein. The routine 600 begins at operation 602, where the hover sensing system 10 determines if there is a presence of an object before hover sensing panel 100. If the presence of an object is detected, the routine 600 proceeds to operation 604.

At operation 604, the hover sensing system 10 initiates scanning and sampling procedures by utilizing various shapes and sizes of RHSAs 124 to detect the distance of the object. The scanning and sampling procedures can be that of the PLA scanning and sampling procedure mentioned above or other scanning and sampling procedures known to those skilled in the art. The detected capacitance signals detected by the various shapes and sizes of RHSA 124 are then stored in its corresponding SVM. The routine 600 then proceeds from operation 604 to operation 606.

At operation 606, the microcontroller 111 determines if any of the detected signal values (Cs), detected by the various RHSA 124, stored in the SVM exceeds the corresponding capacitance signal threshold value of the RHSA 124 utilized. If so, the routing 600 proceeds from operation 606 to operation 608. If not, the routine 600 proceeds back to operation 602, described above.

At operation 608, the microcontroller 111 identifies the smallest RHSA 124 that is capable of detecting capacitance signal values above the capacitance signal threshold value. The routine 600 then proceeds from operation 608 to operation 610. The microcontroller 111 then identifies multiple SVMs that have detected capacitance signals exceeding the SVM's corresponding capacitance signal threshold. The microcontroller 11 then identifies the SVMs that use the smallest RHSA among those identified multiple SVMs.

At operation 610, the microcontroller 111 applies the detected capacitance signals that exceed the SVM's corresponding capacitance signal threshold to a distance formula, wherein the distance formula has a capacitance signal threshold value and a K constant corresponding to the SVM identified in operation 804 and its corresponding RHSA. The routine 600 then proceeds to operation 612.

At operation 612, the microcontroller 111 reports the distance of the object. The routine 600 then ends. It should be noted that it is possible that multiple different capacitance signals stored in the SVM may exceed the SVM's corresponding capacitance signal threshold value. In this regard, the microcontroller 111 may report the longest distance or the shortest distance of the calculated distance values. Alternatively, it the microcontroller 111 may report multiple distance values calculated based on multiple capacitance signals stored in the SVM that exceed the SVM's corresponding capacitance signal threshold value. The shape of the object can then be determined based on the object's multiple distance report.

Figure 7A:
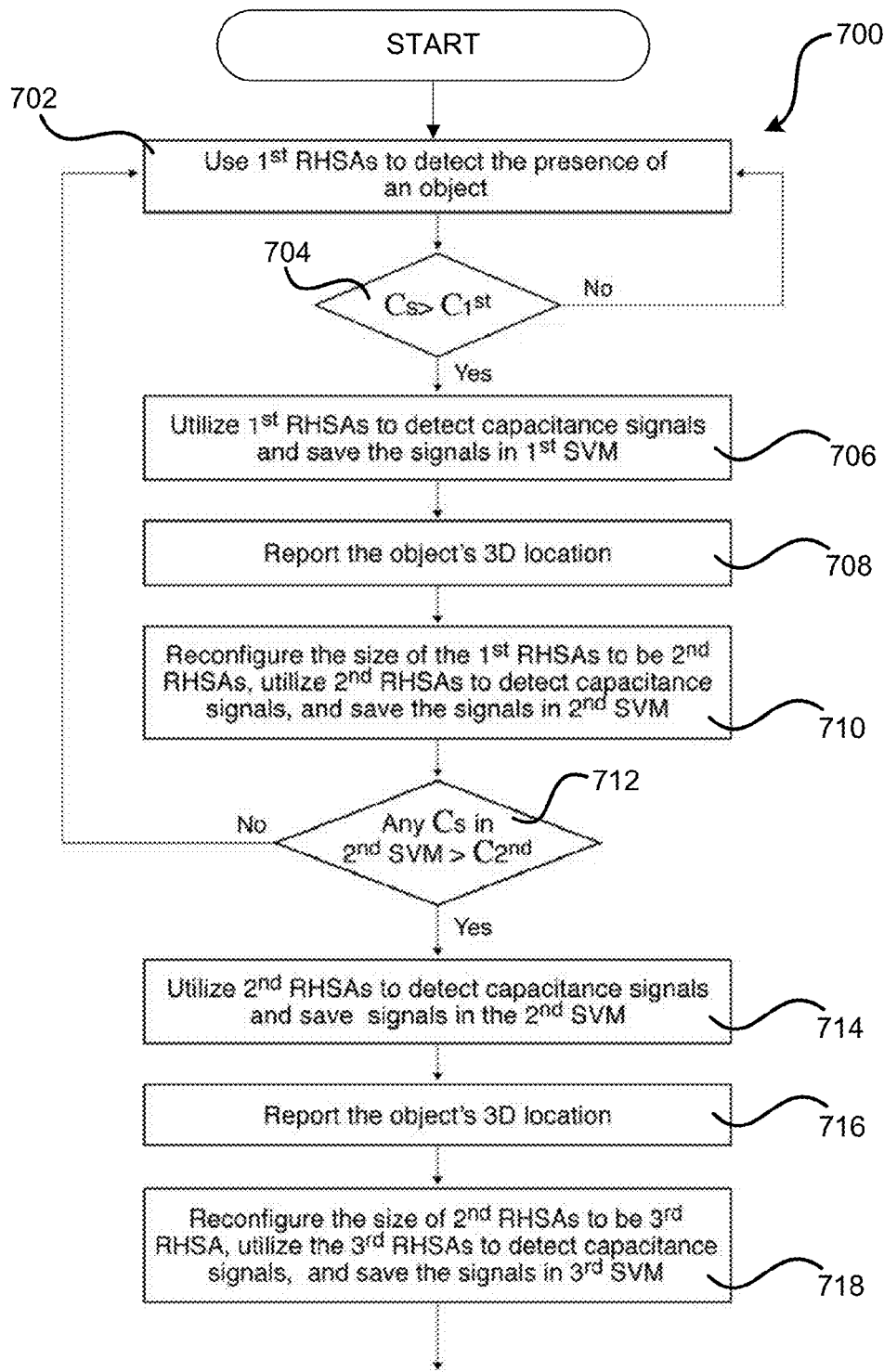
FIGS. 7A and 7B are flow diagrams showing aspects of one illustrative routine for determining the 3D location of objects relative to a hover sensing panel based on signals detected by capacitive sensor electrodes of the hover sensing panel, according to embodiments disclosed herein.
Figure 7B:
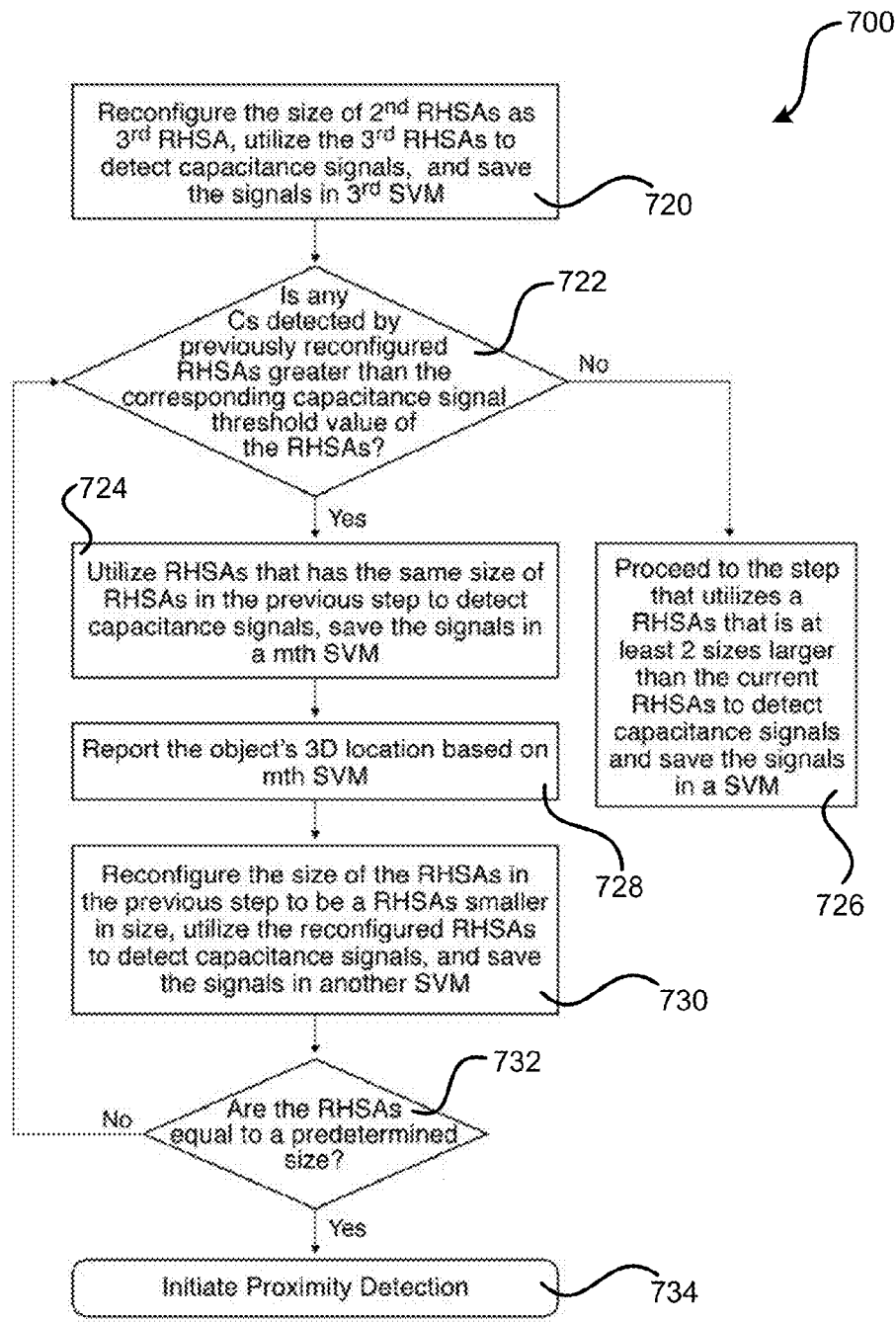

FIGS. 7A and 7B are flow diagrams showing aspects of one illustrative routine 700 for determining the 3D location of objects relative to a hover sensing panel 100 based on signals detected by capacitive sensor electrodes 120 of the hover sensing panel 100, according to one embodiment disclosed herein. The routine 700 begins at operation 702, where the hover sensing system 10 periodically uses a $1^{st}$ RHSA 124 and the scanning mechanism mentioned above with reference to FIG. 1-5 for detecting the presence of an object. The routine 700 then proceeds to operation 702. In one embodiment, the $1^{st}$ RHSA is the largest RHSA 124 among all RHSAs 124 available in the hover sensing system 10 so that its detection range is the longest.

At operation 704, if any capacitance signal value, Cs, detected by the $1^{st}$ RHSA 124 exceeds $C1^{st}$, an object is considered as presenting before the hover sensing panel 100, and the routine 700 proceeds to operation 706. Otherwise, the routine 700 proceeds back to operation 702, described above. The value $C1^{st}$ is the corresponding capacitance signal threshold value of $1^{st}$ RHSA.

At operation 706, the microcontroller 111 utilizes the $1^{st}$ RHSA 124 and the mentioned scanning mechanism, PLA in one embodiment, to detect capacitance signals Cs. The microcontroller 111 then saves the Cs signals in the corresponding $1^{st}$ SVM of the $1^{st}$ RHSA 124. The routine 700 then proceeds from operation 706 to operation 708, where the microcontroller 111 determines the 3D location of the object. The microcontroller 111 might also report the determined 3D location based on the Cs signals stored in the $1^{st}$ SVM. The location of the object on the Z-axis can be determined by using the method disclosed with reference to FIG. 6. When the microcontroller 111 determines the distance of the object to the hover sensing panel 100 along the Z-axis, it may apply the detected Cs in the $1^{st}$ SVM that exceeds the $C1^{st}$ to the distance formula. Alternatively, the microcontroller 111 may report the boundary distance $D1^{st}$ as the distance between the object and hover sensing panel 100 along the Z-axis for its initial report.

The 2D location of the object relative to the X-Y axis of the hover sensing panel 100 can be determined based on the location of Cs values stored in the $1^{st}$ SVM that exceeds $C1^{st}$ as discussed above with regard to FIGS. 1-5. Alternatively, the object's 2D location relative to the X-Y axis of the hover sensing panel 100 can be determined based on the local maximum Cs values stored in the $1^{st}$ SVM. The object's 2D location relative to the X-Y axis of hover sensing panel 100 can be also determined by evaluating the Cs values stored in the SVM in the manner described above with reference to FIGS. 1 to 5. Based on the object's 2D location in the X-Y axis and the object's location in the Z-axis relative to the hover sensing panel 100, the object's 3D location relative to the hover sensing panel 100 can be determined accordingly. The routine 700 then proceeds from operation 708 to operation 710.

At operation 710, the microcontroller 111 reconfigures the size of the $1^{st}$ RHSA 124 as a $2^{nd}$ RHSA 124. The microcontroller 111 then utilizes the $2^{nd}$ RHSA 124 and the above-mentioned scanning mechanism, preferably PLA, to detect capacitance signals Cs. The microcontroller 111 then saves the capacitance signals Cs in the $2^{nd}$ SVM. It should be noted that $2^{nd}$ RHSA 124 may be smaller than $1^{st}$ RHSA 124 for a more accurate reading of the 3D location of an object. For example, when the $1^{st}$ RHSA is a 5×5 RHSA 124, the $2^{nd}$ RHSA 124 is a 4×4 RHSA 124 so that its size is smaller. The routine 700 then proceeds from operation 710 to operation 712.

At operation 712, the microcontroller 111 determines if any capacitance signals Cs detected by the $2^{nd}$ RHSA 124 and stored in the $2^{nd}$ SVM is greater than $C2^{nd}$. If so, the object is still detectable by using a RHSA 124 smaller than the $1^{st}$ RHSA 124, and the routine 700 proceeds from operation 712 to operation 714. If not, the routine 700 proceeds from operation 712 to operation 714.

At operation 714, the microcontroller 111 utilizes the $2^{nd}$ RHSA 124 and the above-mentioned scanning mechanism, preferably PLA, to detect capacitance signals Cs. The microcontroller 111 also saves the capacitance signals Cs in the $2^{nd}$ SVM. The routine 700 then proceeds to operation 716, where the microcontroller 111 determines the 3D location of the object. The microcontroller 111 might also report the determined 3D location based upon the Cs signals stored in the $2^{nd}$ SVM. The routine 700 then proceeds from operation 718 to operation 720.

At operation 720, the microcontroller 111 reconfigures the size of the $2^{nd}$ RHSA 124 to that of the $3^{rd}$ RHSA 124, which is smaller than $2^{nd}$ RHSA 124 in size. The microcontroller 111 then utilizes the $3^{rd}$ RHSA and the above-mentioned scanning mechanism, preferably PLA, to detect and save the capacitance signals Cs in the $3^{rd}$ SVM. The routine 700 then proceeds from operation 720 to operation 722. After reconfiguring the size of RHSA 124 twice, the reconfiguration, detection, and reporting operations described above may be repeated in a similar manner as described below with reference to FIG. 7B.

At operation 722, the microcontroller 111 determines if any capacitance signal Cs detected by previously reconfigured RHSA 124 is greater than the corresponding capacitance signal threshold value of the RHSA. If so, the routine 700 proceeds from operation 722 to operation 724. If not, the routine 700 proceeds from operation 722 to operation 726. At operation 726, the microcontroller 111 utilizes an RHSA 124 that is at least two sizes larger than the current RHSA 124 to detect the capacitance signal, or proceeds to an operation just before the 3D location determination based on capacitance signals detected by an RHSA 124 that is two sizes larger than the current RHSA 124. In each round of the 3D location determination process, when the size of an RHSA 124 after reconfiguration is never utilized before, it is denoted with a new number. Accordingly, the size of each RHSA 124 should have a number to represent it. Moreover, the size of a $1^{st}$ RHSA 124 is greater than that of the $2^{nd}$ RHSA 124, which is greater than that of $3^{rd}$ RHSA 124, etc. At operation 724, the microcontroller 111 utilizes a RHSA 124 that has the same size of the RHSA 124 in the previous operation to detect and save capacitance signals Cs in a $M^{th}$ SVM, wherein M can be any ordinal number $3^{th}$, $4^{th}$, $5^{th}$.

At operation 728, the microcontroller 111 determines the 3D location of the object. The microcontroller 111 might also report the determined 3D location based on the Cs signals stored in the $M^{th}$ SVM. The routine 700 then proceeds from operation 728 to operation 730, wherein the microcontroller 111 reconfigures the size of $M^{th}$ RHSA 124 to be a $N^{th}$ RHSA 124 that is smaller than $M^{th}$ RHSA 124 in size, wherein N is an ordinal number larger than $M^{th}$. The microcontroller 111 utilizes the $N^{th}$ RHSA 124 and the above-mentioned scanning mechanism, preferably the PLA mechanism described with reference to FIG. 5, to save the capacitance signals Cs in the $N^{th}$ SVM. The routine 700 then proceeds from operation 730 to operation 732.

At operation 732, the microcontroller 111 determines if the size of the $N^{th}$ RHSA 124 equals a predetermined size. If so, the routine 700 proceeds from operation 732 to operation 734, in order to initiate proximity touch detection mode (described below with regard to FIGS. 9A-9B). Otherwise, the routine 700 proceeds back to operation 722, described above. Since each RHSA 124 should have a corresponding capacitance signal threshold value and a corresponding SVM, the microcontroller 111 may alternatively exercise determination based on if the Nth SVM equals a predetermined SVM size, or if the corresponding capacitance signal threshold value $CN^{th}$ equals a predetermined capacitance signal threshold value.

Figure 8:
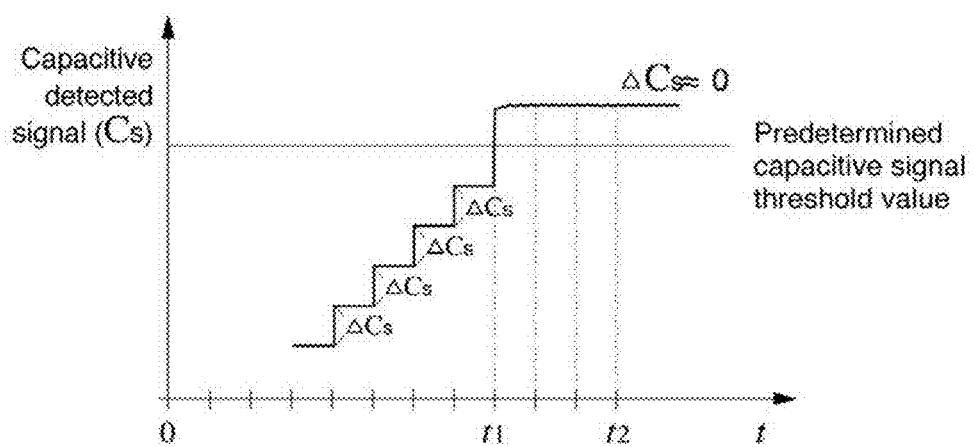
FIG. 8 is a line graph that shows example capacitance signals detected by a particular hover sensing array of a hover sensing panel over time, according to one embodiment disclosed herein.

FIG. 8 is a line graph that shows example capacitance signals detected by a particular hover sensing array 124 of a hover sensing panel 100 over time, according to one embodiment disclosed herein. It should be appreciated that when a RHSA 124 or the panel 100 is being touched, the detected capacitance signal would reach its maximum value and remain almost unchanged over time. Accordingly, whether an object touches the hover sensing panel 100 or the particular RHSA 124, which has a corresponding size of SVM, can be ascertained by evaluating the difference between two sets of detected Cs values, ACs, as detected by the same RHSA 124 or the same CSE 120 consecutively in different time. The consecutively detected Cs values can be saved in two different SVMs, SVM-Tm and SVM-Tm−1, for further calculation.

To avoid a touch being registered due to detected capacitive signal noise, a touch is determined when the two consecutively detected Cs values are both above a predetermined capacitive signal threshold value of the particular RHSA, and the ACs of the two Cs value is below a predetermined value or approximate to zero. For example, when an object touch a 2×2 RHSA 124, at time t1, a Cs(t1) value is detected by the 2×2 RHSA and stored in a 2×2 SVM(t1). At time t2, a Cs(t2) value is detected by the same 2×2 RHSA and stored in a 2×2 SVM(t2). The time difference between t2 and t1 can be one sample clock or multiple sample clocks of ADC 119. The microcontroller 111 may determine the touch based on determining if Cs(t1) is almost equal to Cs(t2), equivalently if the difference between Cs(t1) and Cs(t2), ACs, is below a predetermined value, or equivalently if the difference is approximately zero.

Figure 9A:
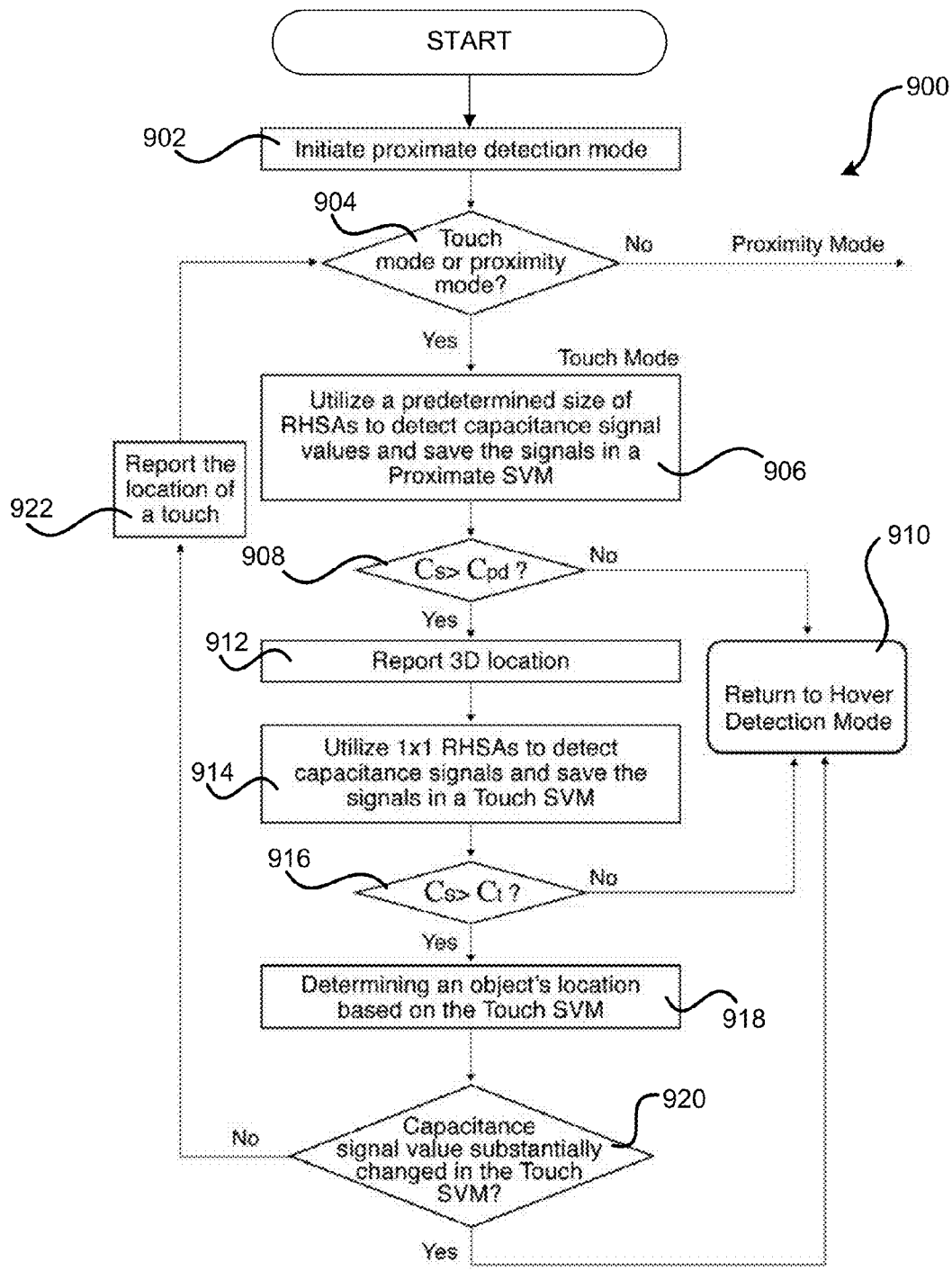
FIGS. 9A and 9B are flow diagrams showing aspects of one illustrative routine for determining a proximate object or a touch by calculating detected capacitance signals, according to one embodiment disclosed herein.
Figure 9B:
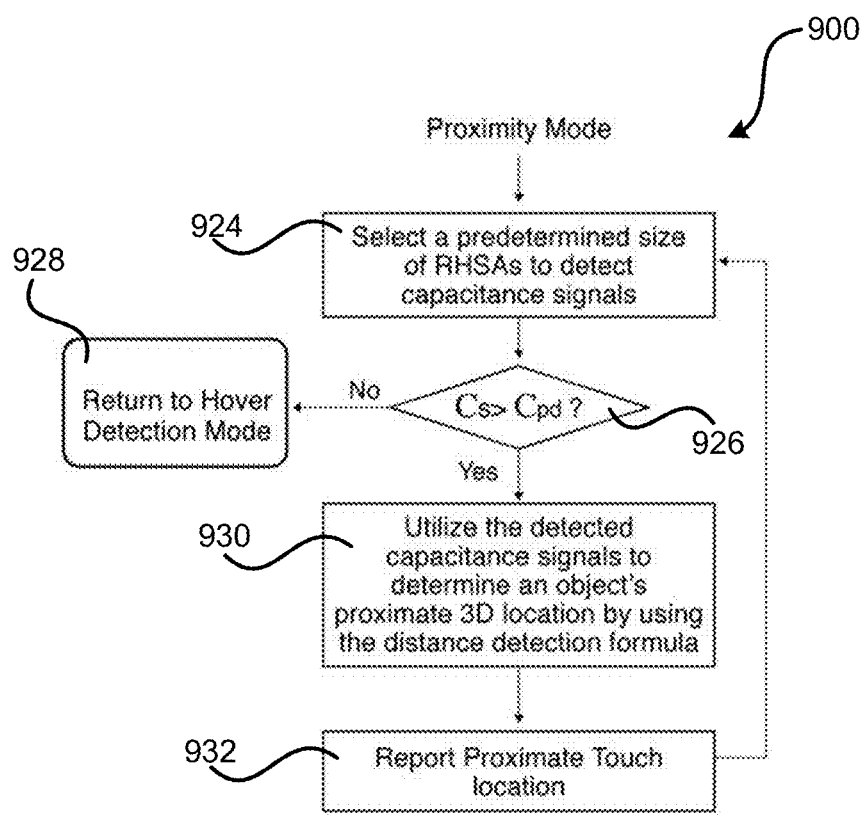

FIGS. 9A and 9B are flow diagrams showing aspects of one illustrative routine 900 for determining a proximate object or a touch by calculating detected capacitance signals, according to one embodiment disclosed herein. The routine 900 begins at operation 902, where the microcontroller 111 initiates a proximity touch detection mode. The proximity touch detection mode can be initiated as described above with regard to FIG. 7B, or it can be initiated by a user command input via an input interface provided by the hover sensing system 10. From operation 902, the routine 900 proceeds to operation 904

At operation 904, the microcontroller 111 determines whether the proximity touch detection mode, touch detection mode, or proximity detection mode is selected. If the proximity detection mode is selected, the routine 900 proceeds from operation 904 to operation 924 (shown in FIG. 9B). If the touch detection mode is selected, the routine 900 proceeds from operation 904 to operation 906.

If the touch detection mode is selected, a touch is identified when an object touches hover sensing panel 100. If the proximity detection mode is selected, a touch is identified when an object falls within a predetermined range of the hover sensing panel 100. The use of two proximity detection modes in one device may be useful in a gaming device, for instance. Most game users prefer an accurate reading of the user's actual touch or click action. But some game users may wish to have a proximity movement some distance above the hover sensing panel 100 to be detected as a touch for certain games that do not require a precise reading of user's touch. Other applications might also be beneficial.

As mentioned briefly above, the hover input device described herein may have switchable touch detection mode or proximity detection modes. A user may choose touch detection mode to avoid a touch being mis-identified when the object does not touch the capacitive touch panel. Alternately, a user may choose the proximity detection mode to gain certain control advantages. The different modes of operation might also be selected for different reasons.

At operation 906, the microcontroller 111 utilizes proximity RHSA 124 with a predetermined size to detect capacitance signal values Cs. The microcontroller 111 then saves the detected capacitance signal values in a proximity SVM. The RHSA 124 utilized at operation 906 can be a RHSA 124 that is smaller in size during the 3D location determination procedure, such as 3×3 RHSA, 3×2 RHSA, 2×2 RHSA, or 2×1 RHSA.

At operation 908, the microcontroller 111 determines if any capacitance signals Cs detected by the proximity RHSA and stored in the proximity SVM is greater than Cpd, wherein Cpd is the corresponding capacitance signal threshold value of proximity RHSA. If so, the object is still detectable by using the proximity RHSA and the routine 900 proceeds from operation 908 to operation 912. Otherwise, the routine 900 proceeds to operation 910, where it returns back to the hover detection mode described above, and preferably back to an operation that utilizes a RHSA 124 that is two sizes larger than the current RHSA 124 to detect capacitance signals or to an operation just before the object's 3D location determination based on capacitance signals detected by a RHSA 124 that is two sizes larger than the current RHSA 124.

At operation 912, the microcontroller 111 determines the 3D location of the object. The microcontroller 111 might also report the determined 3D location based on the Cs signals stored in the proximity SVM. The routine 900 then proceeds from operation 912 to operation 914.

At operation 914, the microcontroller 111 utilizes the smallest RHSA 124, denoted as the touch RHSA 124, of the object's 3D location determination procedure to detect capacitance signal values Cs. The microcontroller 111 stores the detected Cs in a touch SVM. The touch RHSA 124 can be a 1×1 RHSA 124. The routine 900 then proceeds from operation 914 to operation 916.

At operation 916, the microcontroller 111 determines if any capacitance signals Cs detected by the touch RHSA and stored in the touch SVM is greater than Ct, wherein Ct is the corresponding capacitance signal threshold value of touch RHSA. If so, the routine 900 proceeds from operation 916 to operation 918. Otherwise, the routine 900 proceeds to operation 910, where it returns to the hover detection mode described above, and preferably back to an operation that utilizes a RHSA 124 that is two sizes larger than the current RHSA 124 to detect capacitance signals, or to an operation just before the object's 3D location is determined based upon capacitance signals detected by an RHSA 124 that is two sizes larger than the current RHSA 124.

At operation 918, the microcontroller 111 determines the object's 3D location based on Cs stored in the touch RHSA. The routine 900 then proceeds to operation 920, where the microcontroller 111 determines if the capacitance signal stored in the touch SVM has changed substantially over time. As mentioned above with reference to FIG. 8, whether an object is touching the hover sensing panel 100 or the particular RHSA 124 can be ascertained by comparing the Cs values, which exceeds the capacitive signal threshold value of the particular RHSA 124, repeatedly scanned and stored in a SVM at different times. The substantial change can be identified based on determining if Cs(t1) is almost equal to Cs(t2), if the difference between Cs(t1) and Cs(t2) is below a predetermined value, or if the difference is approximately zero.

If the change is not substantial, the object is deemed in contact with hover sensing panel 100, and the routine 900 proceeds from operation 920 to operation 922. If, however, the change is substantial, the object is deemed moved, and the routine 900 then proceeds back to operation 910 where it returns back to hover detection mode, preferably back to an operation that utilize an RHSA 124 that is two times larger than the current RHSA 124 to detect a capacitance signal, or to an operation just before the object's 3D location is determined based on capacitance signals detected by an RHSA 124 that is two times larger than the current RHSA 124.

At operation 922, the microcontroller 111 reports the location of the touch based on capacitance signal values Cs stored in the touch SVM. Since the Cs values stored in the touch SVM are not changed substantially, the object's location is not determined based on the capacitance signal change. Rather, the object's 2D location in the X-Y axis of the hover sensing panel 100 can be determined based on Cs values stored in the touch SVM that exceeds Ct. The Cs values detected by of a touch RHSA are stored in an element of the touch SVM that corresponds to a physical location of the RHSA 124. Accordingly, if any Cs value stored in the touch SVM exceeds Ct, the microcontroller 111 can easily identify the physical location of the touch RHSA being touched with reference to method described above with regard to FIGS. 1-5.

Reference is made to FIG. 9B for illustrating aspects of proximity mode detection. In particular, at operation 924 a predetermined size of RHSA 124 corresponding to a predetermined range of the hover sensing panel 100 is selected to detect capacitance signal values. The detected signals are then saved in a proximity SVM. The routine then proceeds from operation 924 to operation 926.

At operation 926, the microcontroller 111 determines if the Cs values stored in the proximity SVM exceeds Cpd. If so, the routine 900 proceeds from operation 926 to operation 930. Otherwise, the routine 900 proceeds from operation 926 to operation 928, where it returns to the hover detection mode described above. At operation 930, the microcontroller 111 utilizes the distance formula and the detected capacitance signals Cs stored in the proximity SVM to determine the object's 3D location. The routine 900 then proceeds to operation 932 where the microcontroller 111 reports the detected location. The routine 900 then proceeds from operation 932 to operation 924.

In view of the above, it should be appreciated that, based on the object location determination method disclosed above with reference to FIGS. 1 to 9B, the 3D location of an object relative to a hover sensing panel 100 can be determined. Accordingly, the object's 3D movement path can also be detected by the hover sensing panel 100. As will be described below with regard to FIG. 10, a user interface including an identifier that changes its location and shape responding to the object's 3D movement path might also be provided on a device that implements some or all of the mechanisms described above.

Figure 10:
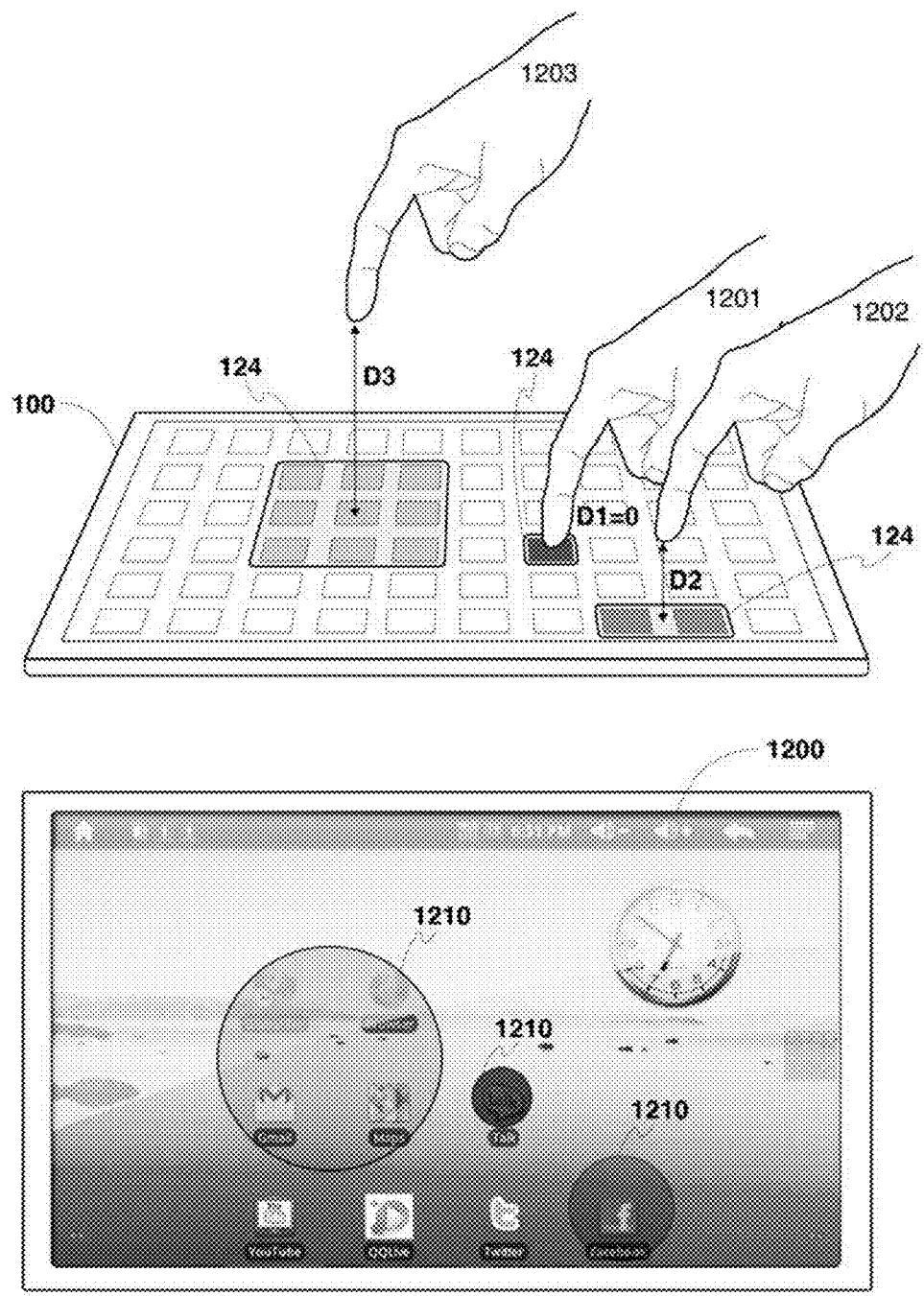
FIG. 10 illustrates a user interaction interface that includes a 3D location identifier for which the shape may be changed corresponding to the 3D movement of an object relative to a hover sensing panel, according to one embodiment disclosed herein.

FIG. 10 illustrates a user interaction interface that includes a 3D location identifier 1210 for which the shape may be changed corresponding to the 3D movement of an object relative to the hover sensing panel 100, according to one embodiment disclosed herein. As shown in FIG. 10, the 3D location identifier 1210 can be a translucent identifier or an opaque identifier. The 3D location identifier might also be presented in other ways.

The 3D location identifier 1210 can be utilizing as a "mouse cursor" for a 2D display screen. Unlike a traditional mouse cursor, the 3D location identifier 1210 may be configured to move in a 2D screen corresponding a user's finger movement, but also to change its shape and transparency when the user's finger moves closer or farther relative to the hover sensing panel 100.

As shown in FIG. 12, the area of the 3D location identifier 1210 may become smaller and less transparent when the user's finger moves closer to hover sensing panel 100. Similarly, the area may become larger and more transparent when the user's finger moves away from the hover sensing panel 100. For example, if the distance of the object 1203 to the hover sensing panel 100, D3, is determined to be greater than the distance of the object 1202 to the hover sensing panel 100, D2, the displayed 3D location identifier 1210 corresponding to object 1203 is larger and more transparent than the displayed 3D location identifier 1210 corresponding to the object 1201.

When the object continues to move away from hover sensing panel 100 such that the largest RHSA 124 of the hover sensing panel 100 can no longer detect the presence of the object, the 3D location identifier 1210 may become transparent and disappear from the 2D screen. When an object touches the hover sensing panel 100, the displayed area of the 3D location identifier 1210 may become opaque and be displayed smaller than a predetermined size, or is the smallest 3D location identifier 1210 that may be displayed on a 2D screen. For example, when an object 1201 touches the hover sensing panel 100 (i.e. distance D1=0), the corresponding 3D location identifier 1210 may become opaque and is the smallest 3D location identifier 1210 displayed on the display 1200.

The 3D location identifier 1210 might also be utilized as a new type of cursor for a 3D screen as well. In particular, the 3D location identifier 1210 can move in a 3D screen corresponding a user's hand movement as relative to the hover sensing panel 100. The 3D location identifier 1210 not only changes its shape and transparence similar to its application with regard to a 2D screen when the user's hand moves closer or farther as relative to the hover sensing panel 100, the 3D location identifier 1210 also changes its depth shown in the 3D screen. That is, when the user's finger moves closer, the 3D location identifier 1210 becomes smaller and its depth displayed on a 3D display is closer to the screen. When the user's finger moves away, the 3D location identifier 1210 becomes larger and its depth displayed on the 3D display is further away from the screen. While the 3D location of the object relative to a RHSA 124 of the hover sensing panel 100 can be determined by microcontroller 111, the size and the shape of the 3D location identifier 1210 may be determined or changed by another computation unit, microprocessor, or processor (not shown) based on the object's distance to the RHSA 124 of the hover sensing panel 100 as determined by the microcontroller 111.

Figure 11A:
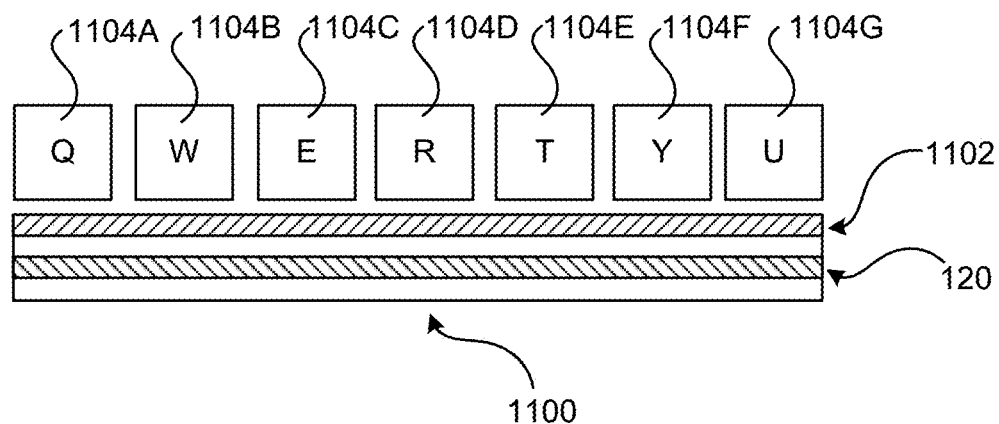
FIGS. 11A and 11B are cross-sectional pictorial diagrams showing an implementation in which the capacitive sensor electrodes are installed under a keyboard and behind a display layer of a display, respectively, according to several embodiments disclosed herein.
Figure 11B:
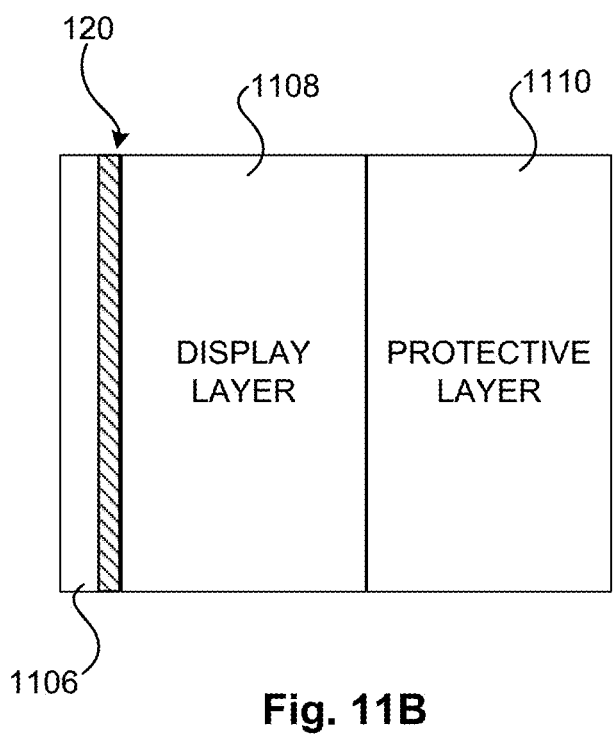

FIGS. 11A and 11B are cross-sectional pictorial diagrams showing an implementation in which the capacitive sensor electrodes 120 are installed under a keyboard and behind a display layer of a display, respectively, according to several embodiments disclosed herein. As shown in FIG. 11A, a keyboard assembly might include a printed circuit board ("PCB") 1100. The PCB 1100 in the example shown in FIG. 11A has multiple layers of signal traces. For example, a layer 1102 is utilized to detect which of the keys 1104A-1104G of the keyboard have been pressed.

According to one implementation, the capacitive sensor electrodes 120 are interwoven with the signal traces on the layer 1102 utilized to detect key presses. In another embodiment, the capacitive sensor electrodes 120 are implemented in a middle layer of the PCB 1100 that is below the layer 1102 utilized to detect key presses. In this manner, the hover sensing mechanisms described above may be utilized to detect the presence of an object hovering over the keyboard keys 1104A-1104G. Detection of such an object might enable certain functionality to be provided. For example, a computer having a keyboard illustrating this functionality might be woken up from a sleep state or the keys 1104A-1104G might be illuminated. Other functionality might also be provided.

In the embodiment shown in FIG. 11B, the hover sensing mechanism described above is utilized with a display device, such as a flat panel display device. In this embodiment, a PCB 1106 implementing the capacitive sensor electrodes 120 may be installed behind the display layer 1108 of the device. The display layer 1108 might be implemented using LCD, OLED, or other conventional display technologies. As shown in FIG. 11B, a protective layer 1110, such as glass, might also be interposed over the display layer 1108, although the protective layer 1110 is not necessary. The various hover detection mechanisms described above may then be implemented using the configuration shown in FIG. 11B. In this way, a user sitting in front of a display device configured as shown in FIG. 11B may be permitted to control objects displayed using the display layer 1108. No other medium needs to be interposed between the display layer 1108 and the user as typically required by conventional touch screen technologies.

It should be appreciated that the subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. An apparatus comprising:
   a capacitive panel having multiple capacitive sensor electrodes affixed to thereto; and
   a microcontroller configured to
     set multiple reconfigurable hover sensing arrays with a first size by electrically coupling at least two electrodes of the multiple capacitive sensor electrodes via an integration bus bar,
     utilize the multiple reconfigurable hover sensing arrays to detect capacitive signals caused by a capacitance between an object and the reconfigurable hover sensing arrays with the first size,
     determine a first threshold value corresponding to the first size of the multiple reconfigurable hover sensing arrays,
     determine a location of the object based on the detected capacitive signals and the first threshold value, and
     save the detected capacitive signals in a first sampled value matrix (first SVM) stored in a memory available to the microcontroller, wherein each element of the first SVM represents a physical location of the multiple reconfigurable hover sensing arrays with the first size.

2. The apparatus of claim 1, wherein the microcontroller is further configured to apply the detected capacitive signals into a distance formula stored in the microcontroller to determine a distance of the object relative to the capacitive panel if the detected capacitive signals exceed the first threshold value.

3. The apparatus of claim 2, wherein the microcontroller is further configured to determine a location of the object in a two dimensional plane that is parallel to the capacitive panel.

4. The apparatus of claim 3, wherein a distance between the two dimensional plane and the capacitive panel is determined to be substantially equal to a distance between the object and the capacitive panel.

5. The apparatus of claim 4, wherein the microcontroller is further configured to report a location of the object relative to the capacitive panel based on the determined two dimensional location of the object and the determined distance of the object relative to the capacitive panel.

6. A computer-implemented method of using a capacitive panel to detect a movement of an object with respect to the capacitive panel comprising:
   setting multiple reconfigurable hover sensing arrays with a first size by electrically coupling at least two electrodes of multiple capacitive sensor electrodes via an integration bus bar;
   utilizing the multiple reconfigurable hover sensing arrays to detect capacitive signals caused by capacitance between an object and the reconfigurable hover sensing arrays with the first size;
   determining a first threshold value corresponding to the first size of the multiple reconfigurable hover sensing arrays;
   determining a location of the object based on the detected capacitive signals and the first threshold value; and
   saving the detected capacitive signals in a first sampled value matrix (first SVM), wherein each element of the first SVM represents a physical location of the multiple reconfigurable hover sensing arrays with the first size.

7. The computer-implemented method of claim 6, further comprising applying the detected capacitive signals into a distance formula to determine a distance of the object relative to the capacitive panel when the detected capacitive signals exceed the first threshold value.

8. The computer-implemented method of claim 7, further comprising determining a location of the object in a two dimensional plane that is parallel to the capacitive panel.

9. The computer-implemented method of claim 8, wherein a distance between the two dimensional plane and the capacitive panel is determined to be substantially equal to a distance between the object and the capacitive panel.

10. The computer-implemented method of claim 9, wherein the microcontroller is further configured to report a location of the object relative to the capacitive panel based on the determined two dimensional location of the object and the determined distance of the object relative to the capacitive panel.

11. A non-transitory computer storage medium encoding a sequence of computer-executable instructions thereupon which, when executed by a processor, cause the processor to:
    set multiple reconfigurable hover sensing arrays with a first size by electrically coupling at least two electrodes of the multiple capacitive sensor electrodes via an integration bus bar;
    utilize the multiple reconfigurable hover sensing arrays to detect capacitive signals caused by capacitance between an object and the reconfigurable hover sensing arrays with the first size;
    determine a first threshold value corresponding to the first size of the multiple reconfigurable hover sensing arrays;
    determine a location of the object based on the detected capacitive signals and the first threshold value; and
    save the detected capacitive signals in a first sampled value matrix (first SVM), wherein each element of the first SVM represents a physical location of the multiple reconfigurable hover sensing arrays with the first size.

12. The non-transitory computer storage medium of claim 11, further comprising instructions further that, when executed by the processor, cause the processor to apply the detected capacitive signals into a distance formula to determine a distance of the object relative to a capacitive panel if the detected capacitive signals exceed the first threshold value.

13. The non-transitory computer storage medium of claim 12, further comprising instructions further that, when executed by the processor, cause the processor to determine a location of the object in a two dimensional plane that is parallel to the capacitive panel.

14. The non-transitory computer storage medium of claim 13, wherein a distance between the two dimensional plane and the capacitive panel is determined to be substantially equal to a distance between the object and the capacitive panel.

15. The non-transitory computer storage medium of claim 14, further comprising instructions further that, when executed by the processor, cause the processor to report a location of the object relative to the capacitive panel based on the determined two dimensional location of the object and the determined distance of the object relative to the capacitive panel.

* * * * *